United States Patent
Yasunobe

(10) Patent No.: US 11,780,286 B2
(45) Date of Patent: Oct. 10, 2023

(54) CABIN

(71) Applicant: KUBOTA CORPORATION, Osaka (JP)

(72) Inventor: Daisuke Yasunobe, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 108 days.

(21) Appl. No.: 17/343,872

(22) Filed: Jun. 10, 2021

(65) Prior Publication Data

US 2021/0291616 A1  Sep. 23, 2021

Related U.S. Application Data

(63) Continuation of application No. PCT/JP2019/049425, filed on Dec. 17, 2019.

(30) Foreign Application Priority Data

| Dec. 19, 2018 | (JP) | 2018-237321 |
| Dec. 19, 2018 | (JP) | 2018-237322 |
| Dec. 19, 2018 | (JP) | 2018-237323 |

(51) Int. Cl.
| B62D 25/04 | (2006.01) |
| B60H 1/24 | (2006.01) |
| B60H 1/00 | (2006.01) |
| B62D 25/12 | (2006.01) |

(52) U.S. Cl.
CPC ..... B60H 1/00207 (2013.01); B60H 1/00378 (2013.01); B62D 25/04 (2013.01); B62D 25/12 (2013.01); *B60H 2001/00235* (2013.01)

(58) Field of Classification Search
CPC ............ B60H 1/00378; B60H 1/00207; B60H 1/00007; B60H 1/247; B60H 1/00564; B60H 1/00849; B60H 1/243
USPC ............................. 296/190.01, 9, 8; 454/141
See application file for complete search history.

(56) References Cited

U.S. PATENT DOCUMENTS

| 9,315,219 B2 | 4/2016 | Knoblett et al. |
| 9,796,238 B2 | 10/2017 | Kawashiri et al. |
| 2006/0006696 A1 | 1/2006 | Umemoto et al. |

(Continued)

FOREIGN PATENT DOCUMENTS

| EP | 0 079 253 A1 | 5/1983 |
| EP | 0 773 124 A1 | 5/1997 |
| EP | 1 758 095 A1 | 2/2007 |

(Continued)

OTHER PUBLICATIONS

Official Communication issued in International Patent Application No. PCT/JP2019/049425, dated Jan. 28, 2020.

(Continued)

*Primary Examiner* — Dennis H Pedder
(74) *Attorney, Agent, or Firm* — KEATING AND BENNETT, LLP

(57) ABSTRACT

To improve a view of a side area from a cabin, the cabin mounted on a machine body includes a hollow rear pillar located on a rear portion of a side surface of the cabin. The rear pillar includes an interior opening through which an interior of the rear pillar is communicated with an interior of the cabin, and an exterior opening through which the interior of the rear pillar is communicated with an exterior of the cabin.

19 Claims, 27 Drawing Sheets

(56) References Cited

U.S. PATENT DOCUMENTS

| | | |
|---|---|---|
| 2011/0056763 A1 | 3/2011 | Tanase et al. |
| 2016/0272257 A1* | 9/2016 | McKillen ............... B62D 35/02 |

FOREIGN PATENT DOCUMENTS

| | | | |
|---|---|---|---|
| EP | 2 527 172 A1 | 11/2012 | |
| EP | 2921327 B1 * | 5/2018 | ......... B60H 1/00378 |
| JP | 62-120025 U | 7/1987 | |
| JP | 03-280 U | 1/1991 | |
| JP | 06-144289 A | 5/1994 | |
| JP | 06-044681 * | 6/1994 | |
| JP | 06-044681 U | 6/1994 | |
| JP | 11-091345 A | 4/1999 | |
| JP | 2003-182989 A | 7/2003 | |
| JP | 2005-231551 A | 9/2005 | |
| JP | 2006-008075 A | 1/2006 | |
| JP | 2009-067384 A | 4/2009 | |
| JP | 2009-113664 A | 5/2009 | |
| JP | 2012-129667 A | 7/2012 | |
| JP | 2015-112880 A | 6/2015 | |
| JP | 2018-047818 A | 3/2018 | |
| KR | 20170008061 A * | 1/2017 | |
| KR | 20170077032 A * | 7/2017 | |
| WO | 2015-083789 A1 | 6/2015 | |
| WO | WO-2015083789 A1 * | 6/2015 | ............ B60J 5/0487 |

OTHER PUBLICATIONS

Official Communication issued in corresponding European Patent Application No. 19900114.0, dated Jul. 15, 2022.
Official Communication issued in corresponding European Patent Application No. 19900114.0, dated Oct. 18, 2022.
Official Communication issued in corresponding Japanese Patent Application No. 2022-003098, dated Nov. 1, 2022.

* cited by examiner

CABIN

CROSS REFERENCE TO RELATED APPLICATIONS

This application is a continuation application of International Application No. PCT/JP2019/049425, filed on Dec. 17, 2019, which claims the benefit of priority to Japanese Patent Application No. 2018-237323, filed on Dec. 19, 2018, to Japanese Patent Application No. 2018-237322, filed on Dec. 19, 2018, and to Japanese Patent Application No. 2018-237321, filed on Dec. 19, 2018. The entire contents of each of these applications are hereby incorporated herein by reference.

BACKGROUND OF THE INVENTION

1. Field of the Invention

The present invention relates to a cabin mounted on a machine body of a working machine such as a tractor, a wheel loader, or a backhoe.

2. Description of the Related Art

Cabins disclosed in Japanese Unexamined Patent Application Publication No. 2012-129667, Japanese Unexamined Patent Application Publication No. 2009-67384, Japanese Unexamined Patent Application Publication No. 2009-113664 are known.

The cabin disclosed in Japanese Unexamined Patent Application Publication No. 2012-129667 includes a front pillar located on a front portion of a side surface of the cabin, a rear pillar located on a rear portion of the side surface, and a center pillar located between the front pillar and the rear pillar. In addition, the cabin has a passenger door located between the front pillar and the center pillar, and an openable quarter glass between the center pillar and the rear pillar.

In addition, the cabin disclosed in Japanese Unexamined Patent Application Publication No. 2009-67384 has a resonator configured to reduce "booming noises" generated inside the cabin.

The cabin disclosed in Japanese Unexamined Patent Application Publication No. 2009-113664 has a first front pillar and a second front pillar arranged to be spaced side by side in a width direction of the cabin. A first rear pillar is located rearward from the first front pillar, and a second rear pillar is located rearward from the second front pillar. Upper portions of the first front pillar and the second front pillar are coupled to each other by a front upper frame, and upper portions of the first rear pillar and the second rear pillar are coupled to each other by a rear upper frame. The upper portions of the first front pillar and the first rear pillar are coupled to each other by a first side upper frame, and the upper portions of the second front pillar and the second rear pillar are coupled to each other by a second side upper frame.

SUMMARY OF THE INVENTION

In an aspect of a preferred embodiment of the present invention, a cabin mounted on a machine body includes a rear pillar located at a rear portion of a side surface of the cabin. The rear pillar is hollow, and includes an interior opening through which a pillar inside, which is an inside of the rear pillar, is communicated with a cabin interior, and an exterior opening through which the pillar inside is communicated with a cabin exterior.

In addition, the rear pillar includes a lid movable between a closing position to allow the lid to close the interior opening and an opening position to allow the lid to open the interior opening when the lid moves from the closing position toward the pillar inside, and includes a biasing member to press the lid in a direction from the opening position toward the closing position.

In addition, the rear pillar includes an opening forming portion oriented forward and formed with the exterior opening.

In addition, the opening forming portion extends backwardly and outwardly in a width direction of the cabin.

In addition, the cabin mentioned above includes a front pillar located at a front portion of the side surface, a door located between the front pillar and the rear pillar, a first door hinge attached to an upper portion of the rear pillar to support the door, and a second door hinge attached to a lower portion of the rear pillar to support the door. The exterior opening is located between the first door hinge and the second door hinge.

In addition, the rear pillar includes a first communicating opening and second communicating opening through which the pillar inside is communicated with the cabin exterior, the first communicating opening and second communicating opening being different from the exterior opening. The first communicating opening is located on a portion corresponding to the first door hinge, and the second communicating opening is located on a portion corresponding to the second door hinge.

In addition, the cabin mentioned above, includes a lid operator to move the lid from the closing position to the opening position and hold the lid at the opening position.

In addition, the cabin mentioned above, includes a roof that is hollow, and an air conditioner located inside the roof. The rear pillar includes an outside-air inlet through which the pillar inside is communicated with the inside of the roof.

In addition, the rear pillar includes a partition wall to partition the pillar inside into a ventilation path through which the outside air taken from the external opening flows toward the interior opening and an outside-air inlet path through which the outside air taken from the external opening flows toward the outside-air inlet, and an outside-air filter attached to the partition wall to remove dust included in the outside air flowing from the exterior opening to the outside-air inlet path.

In another aspect of a preferred embodiment of the present invention, a cabin includes an inner roof defining a ceiling portion of a cabin interior, and a resonator to reduce booming noises generated in the cabin interior. The inner roof is preferably made of resin, and the resonator is defined by the resin of inner roof.

In addition, the cabin mentioned above, includes a driver seat located in the cabin interior. The resonator is located above the driver seat and includes at least one resonance tube, and the resonance tube has a tubular shape extending in a fore-and-aft direction, and includes a closed front end and a rear end that has an opening hole facing the cabin interior.

In addition, the resonator includes the plurality of resonance tubes with different lengths and arranged side by side in a width direction of the inner roof.

In addition, the inner roof includes a downwardly opening recess defined by an upwardly recessed portion of a wall of the inner roof, and the resonator is integral with an upper wall of the recess.

In addition, the resonator protrudes upward and downward from the upper wall of the recess.

In further another aspect of a preferred embodiment of the present invention, a cabin includes a first front pillar and a second front pillar arranged side by side at an interval in the width direction of the cabin, a first rear pillar located rearward from the first front pillar, a second rear pillar located rearward from the second front pillar, a front upper frame coupling an upper portion of the first front pillar and an upper portion of the second front pillar to each other, a rear upper frame coupling an upper portion of the first rear pillar and an upper portion of the second rear pillar to each other, a first side upper frame coupling an upper portion of the first front pillar and an upper portion of the first rear pillar to each other, and a second side upper frame coupling an upper portion of the second front pillar and an upper portion of the second rear pillar to each other. The front upper frame has a curved shape projecting upward in a front view, and the first side upper frame and the second side upper frame each have a curved shape projecting upward in a side view.

In addition, the first side upper frame and the second side upper frame are extended upwardly and inwardly in the width direction and are each curved upward to have an arc shape.

In addition, the first side upper frame and the second side upper frame each includes a rear end located at the same height with the rear upper frame.

In addition, the cabin mentioned above, includes a first seal catcher with which a seal is in contact, the seal extending from one side of an upper surface of the front upper frame to an upper surface of the first side upper frame, and a second seal catcher with which another seal is in contact, the other seal extending from the other side of the upper surface of the front upper frame to an upper surface of the second side upper frame.

In addition, the first rear pillar includes a first upper wall under which a rear portion of the first side upper frame is to be provided, and the second rear pillar includes a second upper wall under which a rear portion of the second side upper frame is to be provided.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

DETAILED DESCRIPTION OF THE PREFERRED EMBODIMENTS

Figure 1:
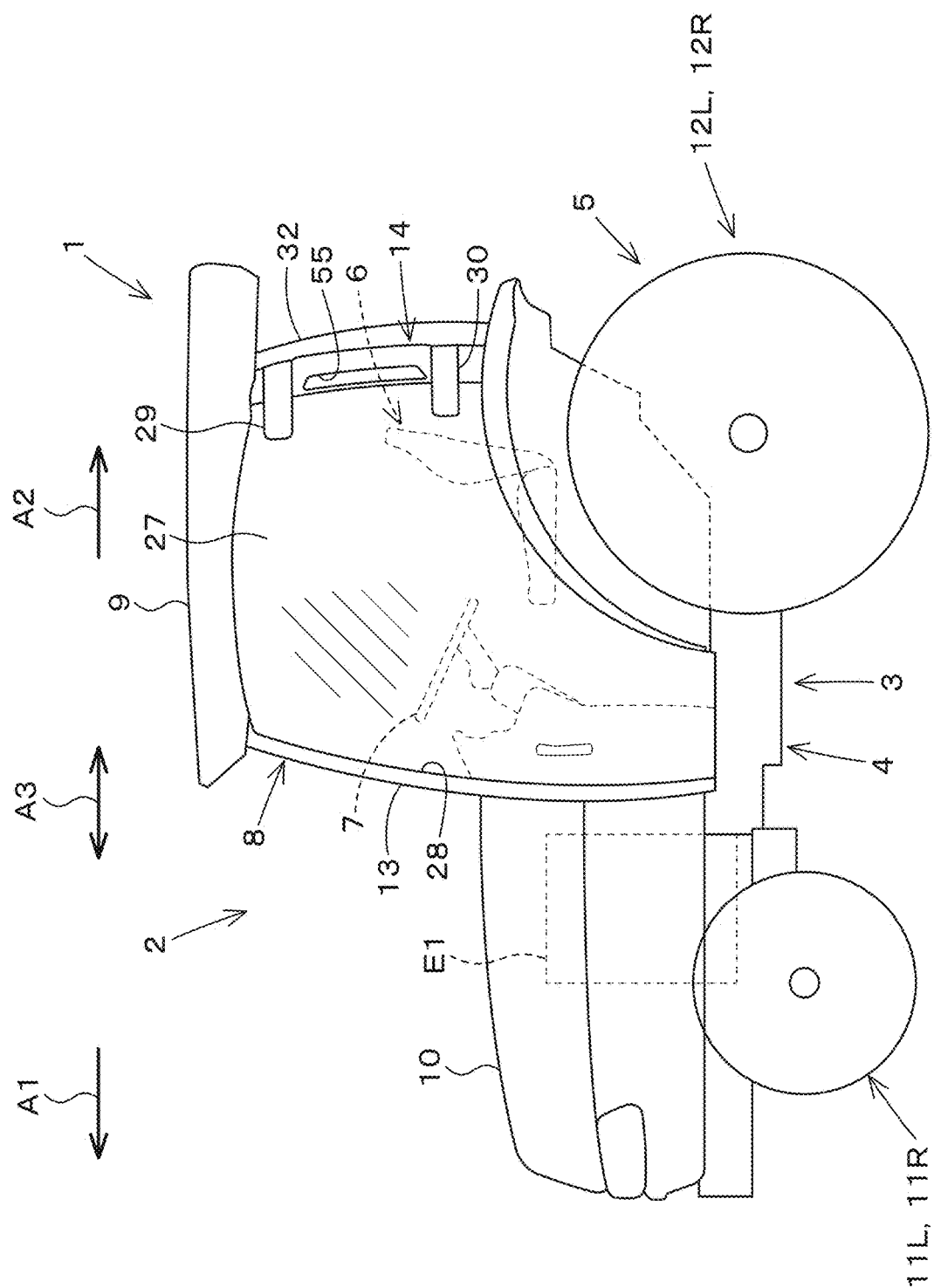
FIG. 1 is a side view of a tractor.

The preferred embodiments will now be described with reference to the accompanying drawings, wherein like reference numerals designate corresponding or identical elements throughout the various drawings. The drawings are to be viewed in an orientation in which the reference numerals are viewed correctly.

With reference to drawings, preferred embodiments of the present invention will be described below.

FIG. 1 is a schematic side view illustrating a tractor 2 including a cabin 1 according to the present preferred embodiment. In this preferred embodiment, the tractor 2 is exemplified as a working machine (vehicle) on which a cabin 1 is mounted, but the working machine may be a wheel loader, a backhoe, or another working machine.

In this preferred embodiment, a direction of an arrowed line A1 (a forward direction of the tractor 2) in FIG. 1 is referred to as the front, a direction of an arrowed line A2 (a backward direction of the tractor 2) in FIG. 1 is referred to as the rear, and a direction of an arrowed line A3 in FIG. 1 is referred to as a fore-and-aft direction. Thus, a front surface side of FIG. 1 is referred to as the left, and a back surface side of FIG. 1 is referred to as the right. A horizontal direction orthogonal to the fore-and-aft direction A3 is referred to as a width direction. Directions from a center portion of the tractor 2 toward the right and toward the left in the width direction are referred to as an outward width direction. In other words, the outward width direction is the width direction extending away from the center of the tractor 2. A direction opposite to the outward width direction is referred to as an inward width direction. In other words, the inward width direction is the width direction approaching toward the center of the tractor 2.

As shown in FIG. 1, the tractor 2 includes a travelable machine body (vehicle body) 3. The machine body 3 includes a prime mover E1 and a transmission case 4.

The prime mover E1 is a diesel engine, for example. The prime mover E1 is located at a front portion of the tractor 2 and is covered by a hood 10. The prime mover E1 may be an electric motor, or may be a hybrid system including a diesel engine and an electric motor. The hood 10 preferably has a curved shape with an upper surface protruded slightly upward.

The transmission case 4 directly couples a flywheel housing that houses a flywheel, a clutch housing that houses a clutch configured to transmit power of the prime mover E1 transmitted through the flywheel, and a transmission case housing a transmission device configured to shift in speed the power transmitted through the clutch, for example.

As shown in FIG. 1, the tractor 2 includes a traveling device 5 that supports the machine body 3 so that the machine body 3 can travel. The traveling device 5 is exemplified as a wheel-type traveling device 5 including a plurality of front wheels 11L and 11R located on a front portion of the machine body 3 and a plurality of rear wheels 12L and 12R located on a rear portion of the machine body 3.

As shown in FIG. 1, the cabin 1 is mounted on the rear portion of the machine body 3. A driver seat 6 on which the operator sits is located on a rear portion of an interior of the cabin 1 (referred to as a cabin interior). A steering wheel 7 for steering the front wheels 11L and 11R is located in front of the driver seat 6, for example.

Figure 2:
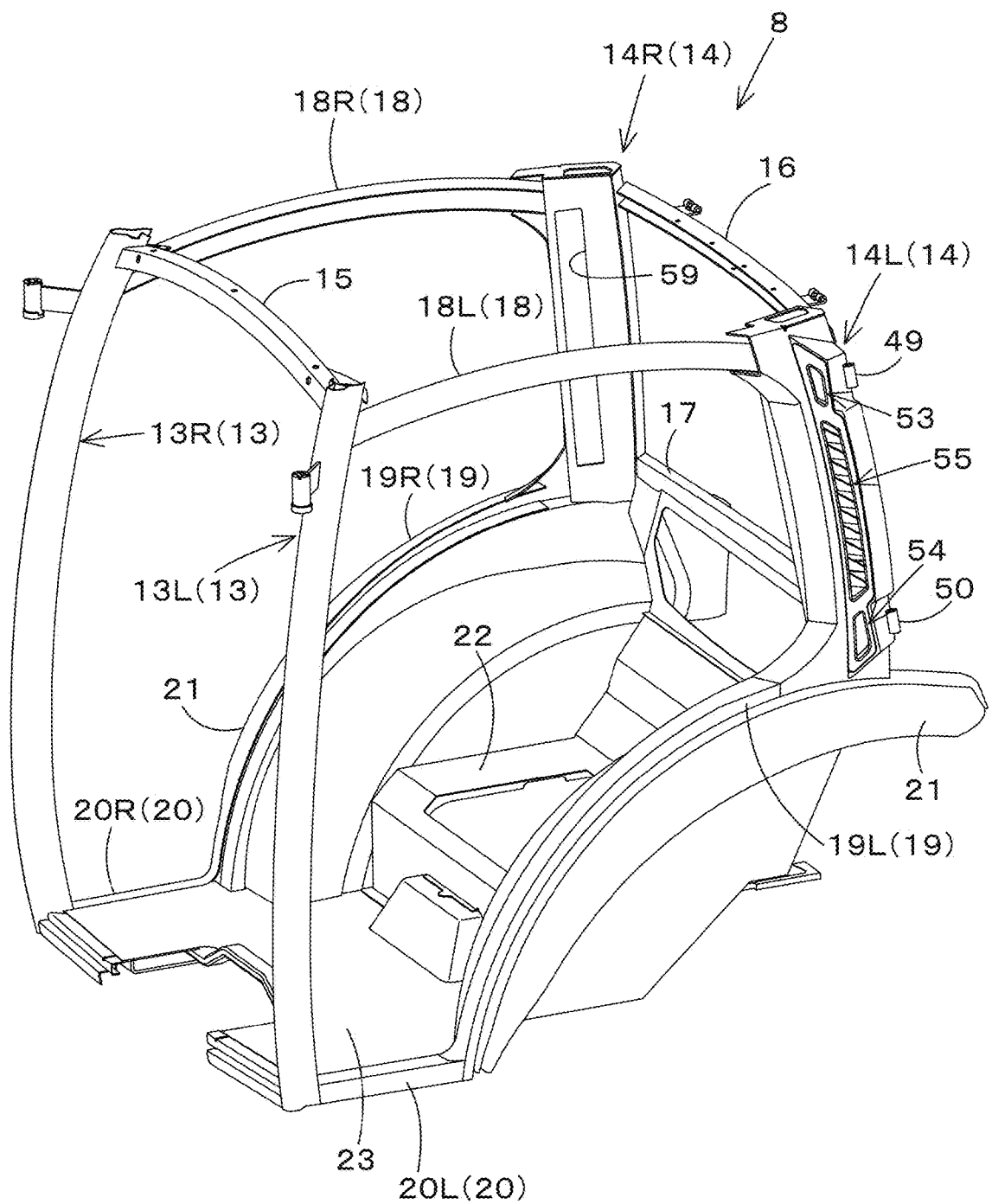
FIG. 2 is a perspective view of a cabin frame.

As shown in FIG. 1, the cabin 1 includes a cabin frame 8 that defines a framework. A roof 9 is located on an upper portion of the cabin frame 8. As shown in FIG. 2, the cabin frame 8 according to the present preferred embodiment is a four-pillar cabin frame without a center pillar (that is, a quarter pillar).

Figure 4:
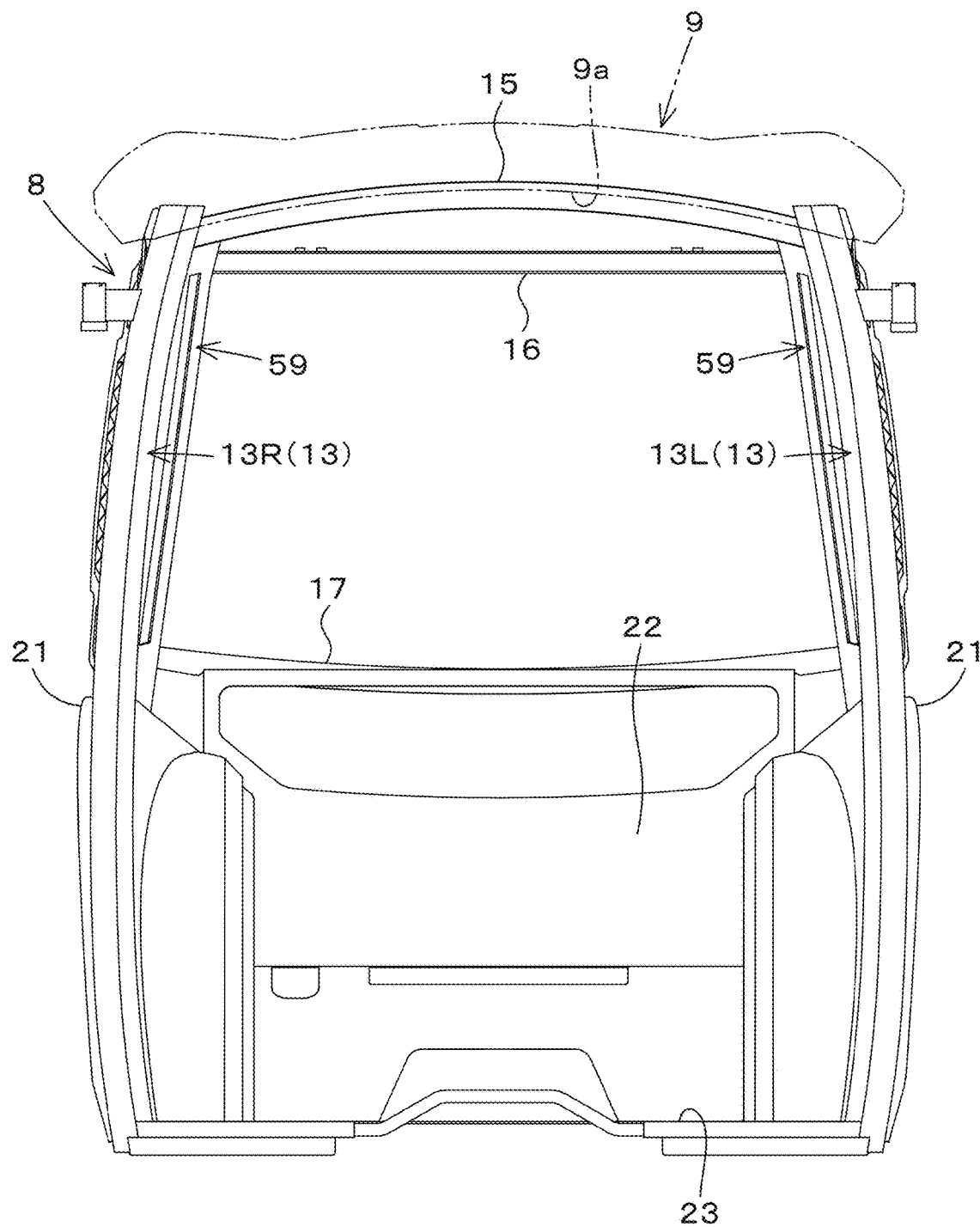
FIG. 4 is a front view of the cabin frame.

As shown in FIGS. 2 and 4, the cabin frame 8 includes a front portion defined by a left front pillar (also referred to as a first front pillar) 13L and a right front pillar (also referred to as a second front pillar) 13R. In other words, the cabin frame 8 has the first front pillar 13L and the second front pillar 13R arranged side by side with a clearance in the width direction. The first front pillar 13L is located at a front portion of a left side face of the cabin 1. The second front pillar 13R is located at a front portion of a right side surface of the cabin 1. Upper portions of the first front pillar 13L and the second front pillar 13R are coupled to each other by a front upper frame 15.

The first front pillar 13L and the second front pillar 13R are also collectively referred to as front pillars 13.

Figure 6:
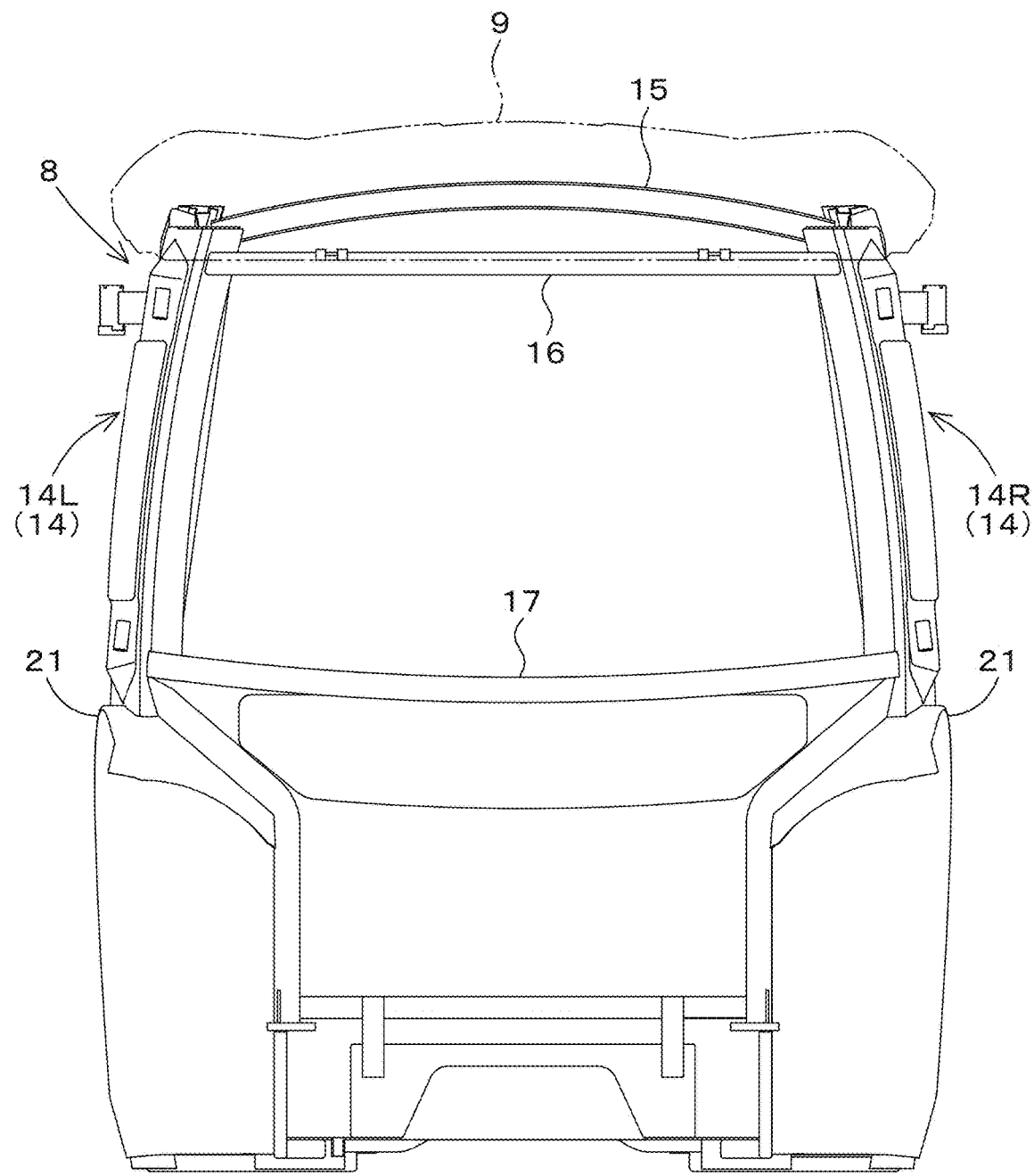
FIG. 6 is a back view of the cabin frame.

As shown in FIGS. 2 and 6, the cabin frame 8 includes a rear portion defined by a left rear pillar (also referred to as a first rear pillar) 14L and a right rear pillar (also referred to as a second rear pillar) 14R. In other words, the cabin frame 8 has the first rear pillar 14L and the second rear pillar 14R arranged side by side with a clearance in the width direction. The first rear pillar 14L is located at a rear portion of the left side of the cabin 1. The second rear pillar 14R is located at a rear portion of the right surface of the cabin 1. The first rear pillar 14L is located rearward from the first front pillar 13L, and the second rear pillar 14R is located rearward from the second front pillar 13R. Upper portions of the first rear pillar 14L and the second rear pillar 14R are coupled to each other by a rear upper frame 16. The lower portions of the first rear pillar 14L and the second rear pillar 14R are coupled to each other by a rear lower frame 17.

The first rear pillar 14L and the second rear pillar 14R are also collectively referred to as rear pillars 14.

Figure 3:
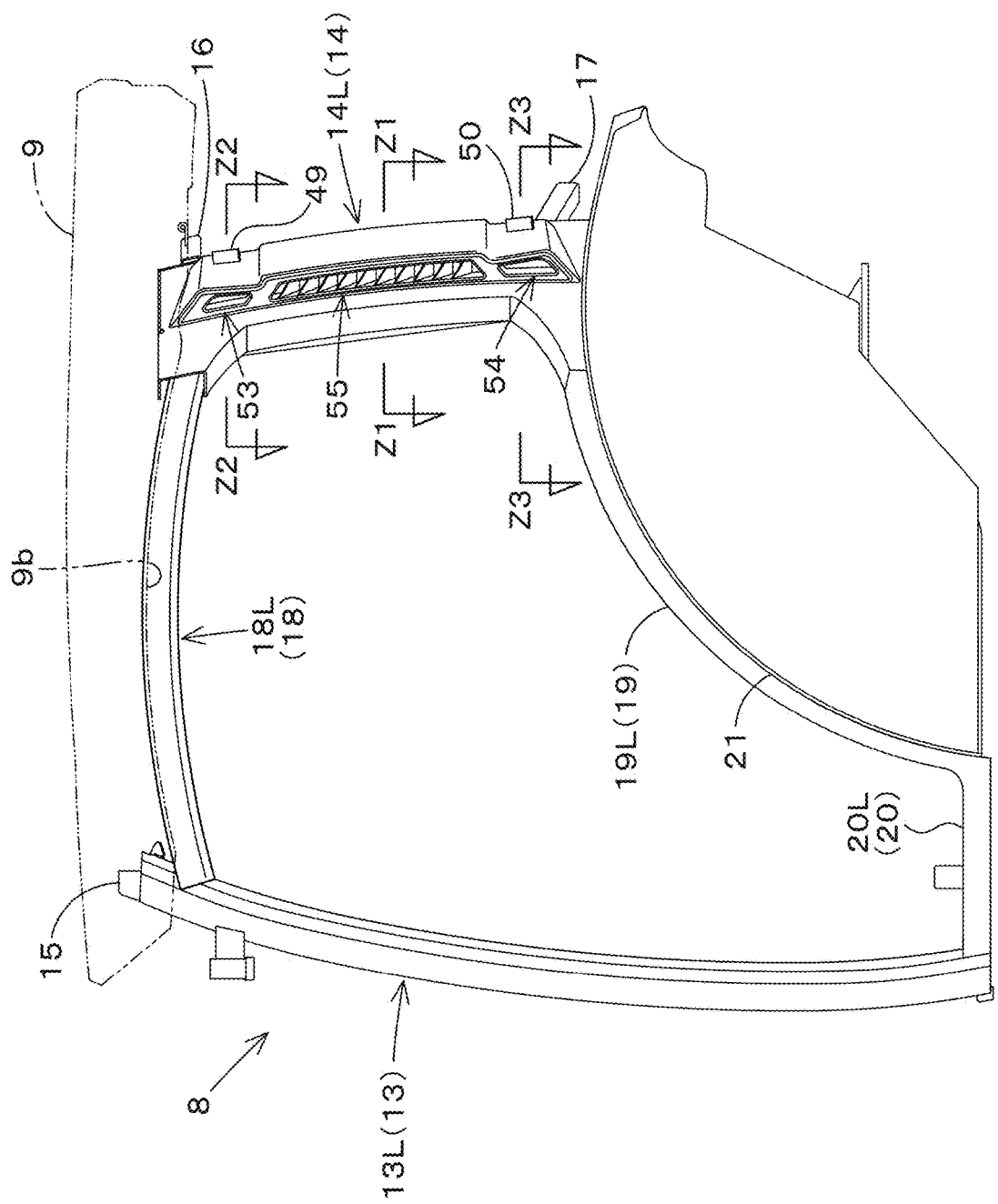
FIG. 3 is a side view of the cabin frame.

As shown in FIGS. 2 and 3, the cabin frame 8 includes a left side upper frame (also referred to as a first side upper frame) 18L coupling the upper portions of the first front pillar 13L and the first rear pillar 14L to each other, and a right side upper frame (also referred to as a second side upper frame 18) 18R coupling the upper portions of the second front pillar 13R and the second rear pillar 14R to each other.

The first side upper frame 18L and the second side upper frame 18R are also collectively referred to as side upper frames 18.

As shown in FIGS. 2 and 3, a left side lower frame (referred to as a first side lower frame) 19L is coupled to a lower portion of the first rear pillar 14L.

The first side lower frame 19L extends downwardly forward from the lower portion of the first rear pillar 14L, and its lower end is coupled to the lower end of the first front pillar 13L by a left coupling frame (referred to as a first coupling frame) 20L. As shown in FIG. 2, a lower portion of the second rear pillar 14R is coupled to a right side lower frame (referred to as a second side lower frame) 19R. The second side lower frame 19R extends downwardly forward from the lower portion of the second rear pillar 14R, and its lower end is coupled to the lower end of the second front pillar 13R by a right coupling frame (referred to as a second coupling frame) 20R.

The first side lower frame 19L and the second side lower frame 19R are also collectively referred to as side lower frames 19, and the first coupling frame 20L and the second coupling frame 20R are also collectively referred to as coupling frames 20.

As shown in FIG. 2, rear wheel fenders 21 covering the rear wheels 12L and 12R are fixed to a lower surface of the side lower frame 19 and the lower end of the rear pillar 14.

Figure 7:
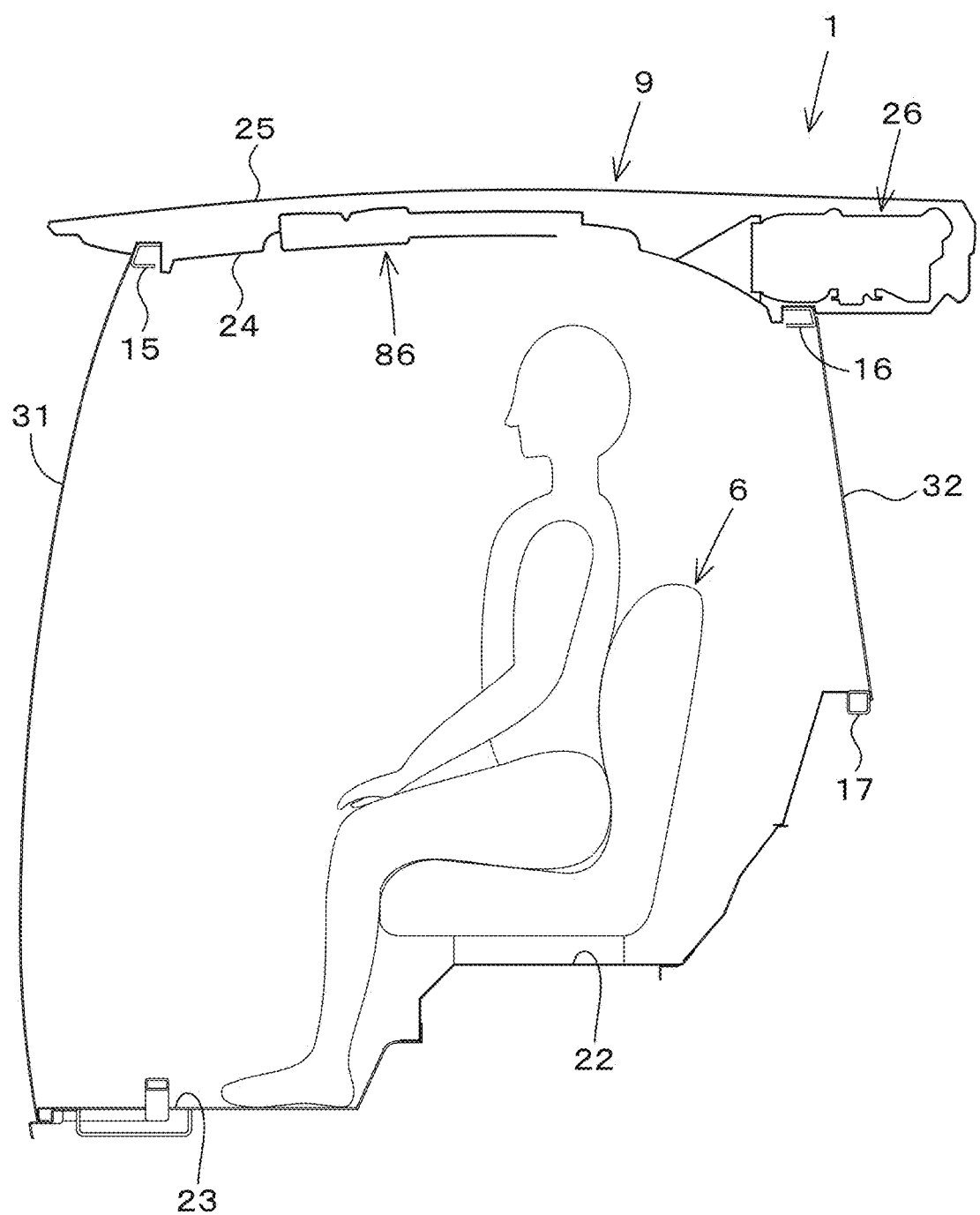
FIG. 7 is a side cross-section view of a cabin.

As shown in FIG. 2, a floor sheet 22 is located between the left and right rear wheel fenders 21. As shown in FIG. 7, the front portion of the floor seat 22 is arranged below the driver seat 6, and the driver seat 6 is attached to the floor seat 22. A rear portion of the floor seat 22 extends upwardly backward, and is located on a back side of the driver seat 6. A step 23, which defines the floor, extends forward from a front lower end of the floor seat 22. The roof 9 is preferably hollow. In particular, the roof 9 includes an inner roof 24 that defines a ceiling and the like of the cabin interior, and an outer roof 25 that defines an upper wall and the like of the roof 9, and the roof 9 has a hollow space between the inner roof 24 and the outer roof 25. An air conditioner (that is, and air conditioning unit) 26 to condition the air inside the cabin is arranged on a rear inside portion of the roof 9. The air conditioner 26 is mounted on the rear upper frame 16.

As shown in FIG. 1, doors 27 are located on the left and right sides of the cabin 1 to close passenger entrances 28 surrounded by front pillars 13, side upper frames 18, rear pillars 14, side lower frames 19 and coupling frames 20. In particular, the doors 27 are located between the front pillars 13 and the rear pillars 14, and are supported by the rear pillars 14 with first door hinges 29 and second door hinges 30, and thus can be opened and closed. The first door hinges 29 are attached to the upper portions of the rear pillars 14, and the second door hinges 30 are attached to the lower portions of the rear pillars 14. The doors 27 are panels having light transmittance such as transparent glasses.

On a front side of the cabin frame 8, a front panel 31 is located to extend from the first front pillar 13L to the second front pillar 13R (see FIG. 7). In addition, on a back side of the cabin frame 8, a rear panel 32 extends from the first rear pillar 14L to the second rear pillar 14R (see FIG. 7). The front panel 31 and the rear panel 32 are panels having light transmittance such as transparent glasses. The front panel 31 is fixed to the first front pillar 13L, the second front pillar 13R, the front upper frame 15, and the like, and an upper portion of the rear panel 32 is attached to the rear upper frame 16 with a hinge that can move about an axis extending in the width direction.

Next, a configuration of the rear pillar 14 will be described in detail.

Since the first rear pillar 14L and the second rear pillar 14R are symmetrical with respect to a vertical plane passing through the center of the cabin 1 in the width direction and orthogonal to the width direction, the first rear pillar 14L and the second rear pillar 14R will be described collectively.

Figure 8:
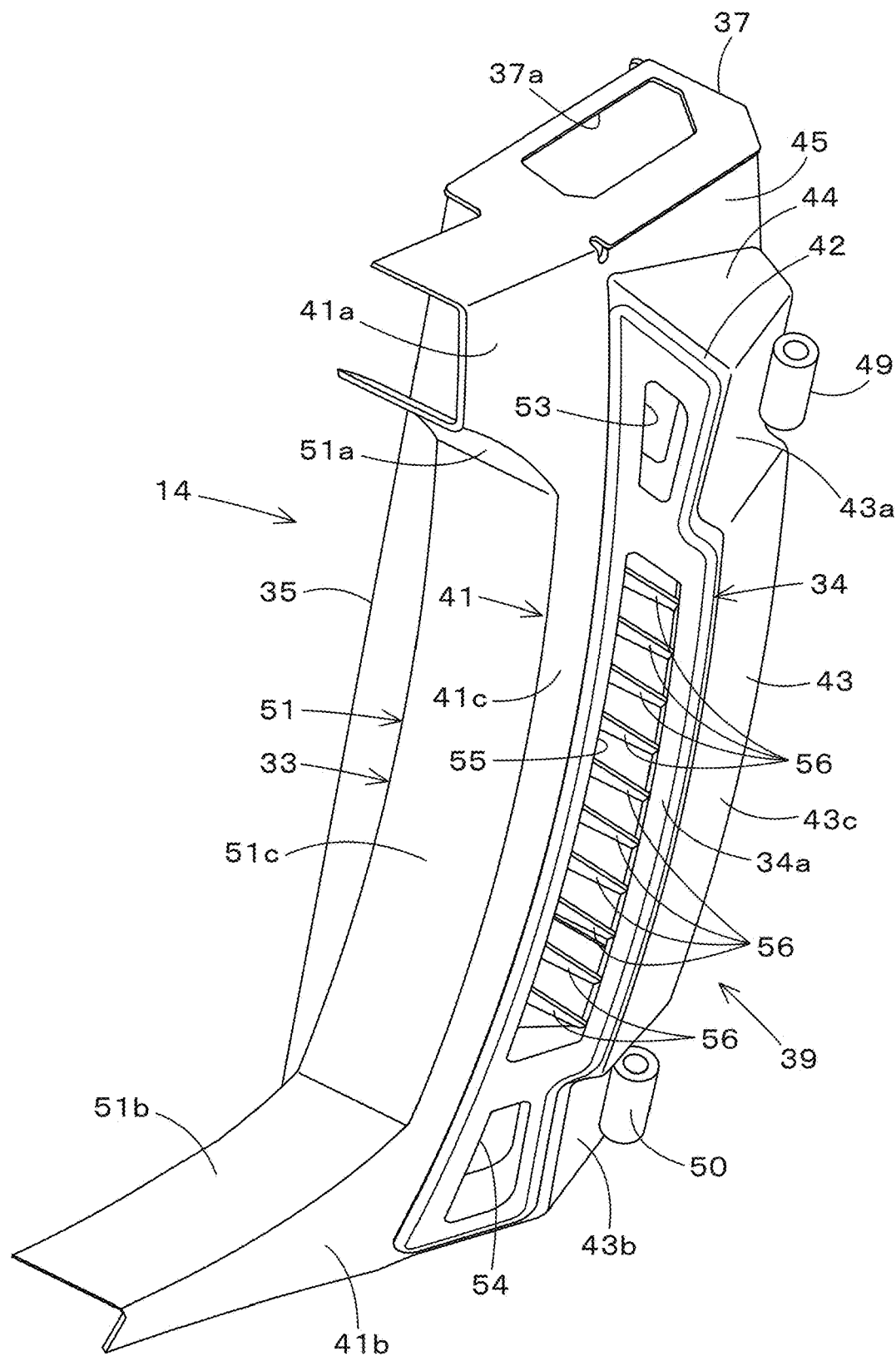
FIG. 8 is a perspective view of a rear pillar seen from a cabin exterior.
Figure 9:
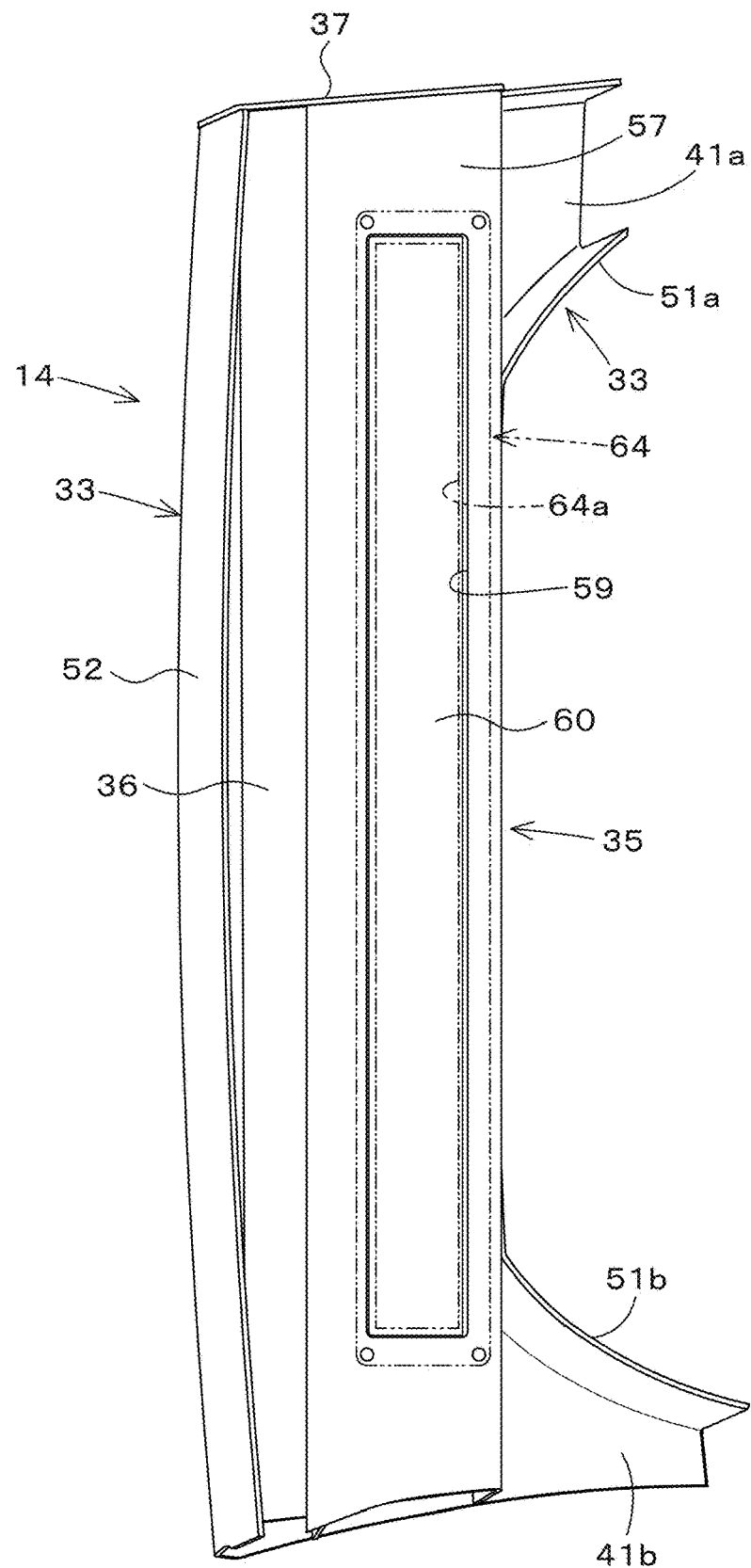
FIG. 9 is a side view of the rear pillar seen from the cabin interior.
Figure 10:
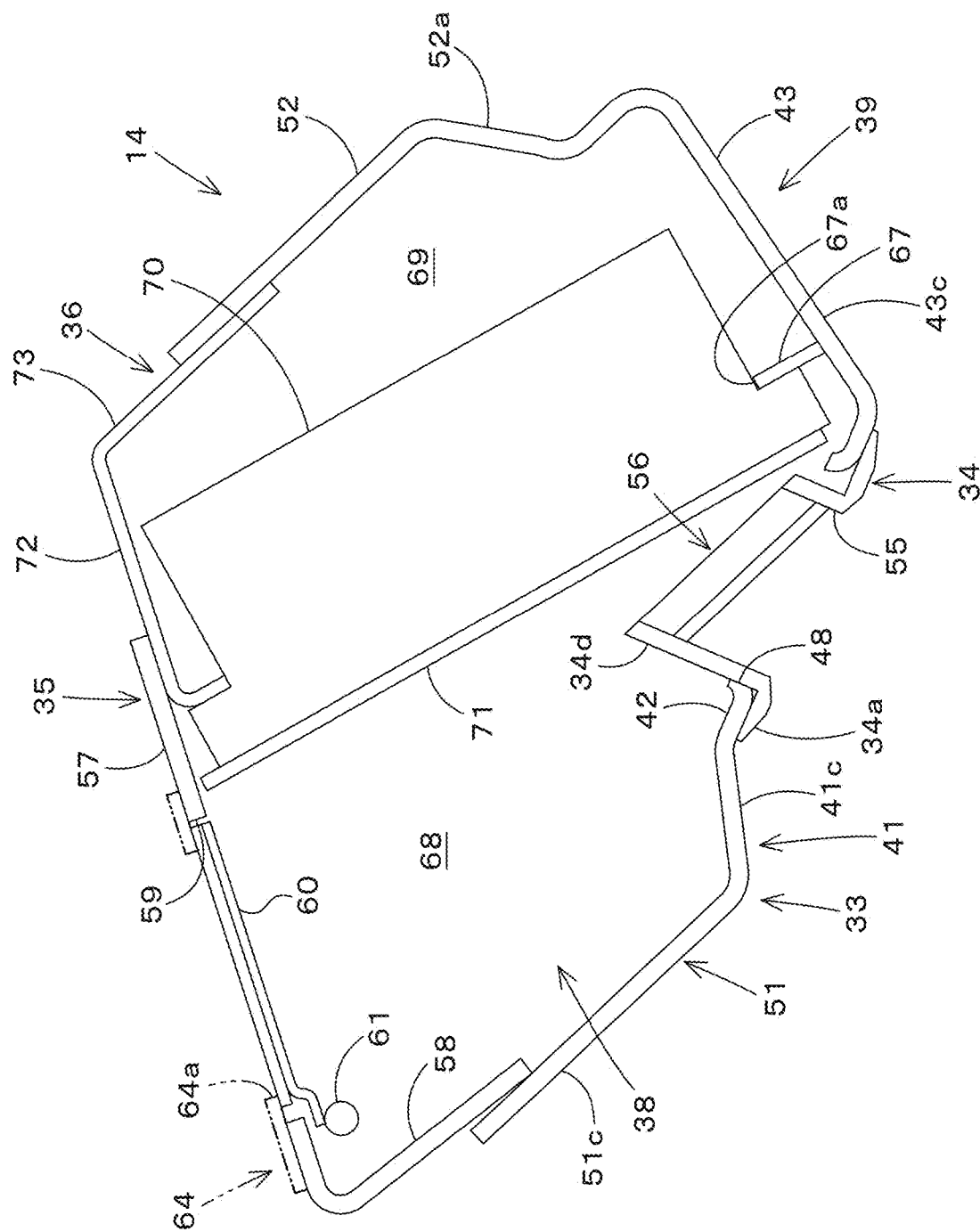
FIG. 10 is a cross-sectional view of a Z1-Z1 arrowed line of FIG. 3.
Figure 11:
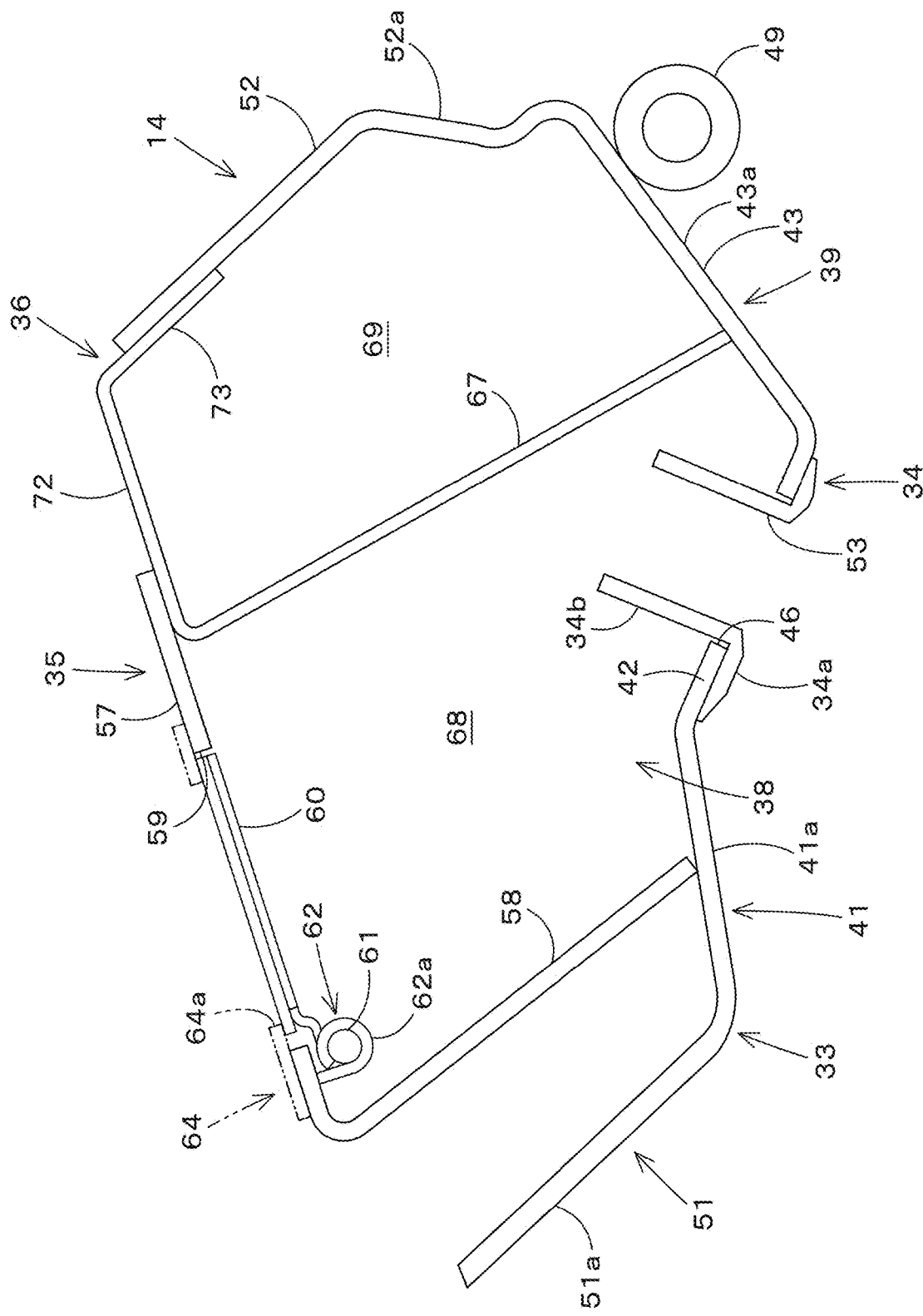
FIG. 11 is a cross-sectional view of a Z2-Z2 arrowed line of FIG. 3.
Figure 12:
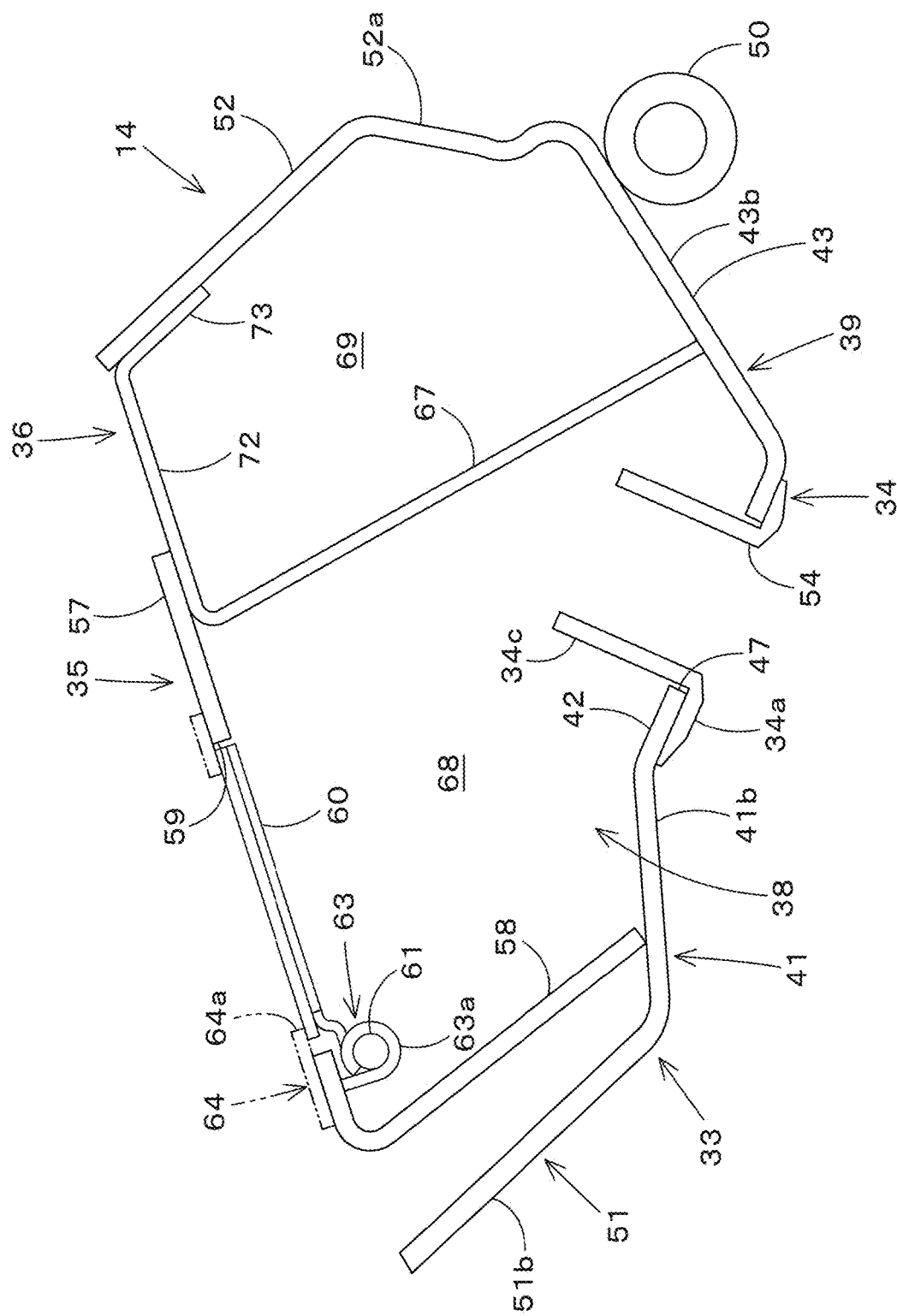
FIG. 12 is a cross-sectional view of a Z3-Z3 arrowed line of FIG. 3.

As shown in FIGS. 8 to 12, the rear pillar 14 includes a first member 33, a second member 34, a third member 35, a fourth member 36, and a fifth member 37. As shown in FIGS. 10 to 12, the rear pillar 14 is hollow and surrounded by the first to fifth members 33 to 37. The inside of the rear pillar 14 is referred to as a pillar inside 38.

As shown in FIG. 8, the first member 33 includes an outer wall 39 defining an outer surface of the rear pillar 14. The outer wall 39 includes a first portion 41, a second portion 42, a third portion 43, a fourth portion 44, and a fifth portion 45. The first portion 41 defines a front portion of the outer wall 39. This first portion 41 is a door contacting portion (hereinafter referred to as a door contacting portion 41) to which the door 27 contacts with a sealing member. The door contacting portion 41 includes an upper portion 41a, a lower portion 41b, and a middle portion 41c between the upper portion 41a and the lower portion 41b. The middle portion 41c is long in the vertical direction, with the upper portion 41a protruded forward from the middle portion 41c and the lower portion 41b protruded forward from the middle portion 41c.

As shown in FIGS. 8 and 10, the second portion 42 is extended outward in the width direction from a rear edge of the door contacting portion 41 and faces forward. In particular, the second portion 42 has an inclined shape that extends backwardly and outwardly in the width direction from the rear edge of the door contacting portion 41.

As shown in FIGS. 10 to 13, the second portion 42 includes a first insertion hole 46, a second insertion hole 47, and a third insertion hole 48 each formed through the second portion 42. The first insertion hole 46 is formed in an upper portion of the second portion 42, the second insertion hole 47 is formed in a lower portion of the second portion 42, and the third insertion hole 48 is formed in a vertically middle portion of the second portion 42. This second portion 42 is an attachment wall to which the second member 34 is attached.

As shown in FIG. 8, the third portion 43 extends backward from a rear edge of the second portion 42. The third portion 43 includes an upper portion 43a, a lower portion 43b, and a middle portion 43c between the upper portion 43a and the lower portion 43b. The upper portion 43a and lower portion 43b are recessed inward in the width direction from the middle portion 43c, a first tubular portion 49 to which the first door hinge 29 is attached is fixed to a rear portion of a recessed portion of the upper portion 43a, and a second tubular portion 50 to which the second door hinge 30 is attached is fixed to a rear portion of a recessed portion of the lower portion 43b.

As shown in FIG. 8, the fourth portion 44 extends from an upper edge of the third portion 43 in the inward width direction. The fifth portion 45 extends upward from an inner edge of the fourth portion 44 in the width direction.

As shown in FIG. 8, the first member 33 includes a front wall 51 defining a front side of the rear pillar 14. The front wall 51 includes an upper portion 51a, a lower portion 51b, and a middle portion 51c between the upper portion 51a and the lower portion 51b. The upper portion 51a extends inward in the width direction from a lower edge of the upper portion 41a of the door contacting portion 41. The lower portion 51b extends inward in the width direction from an upper edge of the lower portion 41b of the door contacting portion 41. The middle portion 51c extends inward in the width direction from a front edge of the middle portion 41c of the door contacting portion 41.

As shown in FIGS. 9 to 12, the first member 33 includes a rear wall 52 defining a rear side of the rear pillar 14. The rear wall 52 extends inward in the width direction from the third portion 43 and the fifth portion 45. The rear wall 52 includes on an outward side thereof in the width direction a panel contacting portion 52a contacting the rear panel 32 via a sealing member.

As shown in FIGS. 8, 10 and 12, the second member 34 is fitted to the second portion 42 of the outer wall 39 and is fixed to the second portion 42. In particular, the second member 34 includes a contacting wall (referred to as an opening forming portion) 34a that is in contact with a front surface of the second portion 42. In the vertically middle portion of the contacting wall 34a, an exterior opening 55 (referred to as a cabin exterior) is formed to communicate the pillar inside 38 with the outside of the cabin 1. This exterior opening 55 allows outside air (air in the cabin exterior) to be taken into the pillar inside 38. In addition, since the contacting wall (that is, the opening forming portion) 34a of the second member 34 faces forward, the outside air can be efficiently taken into the pillar inside 38 when the tractor 2 travels. Moreover, the contacting wall 34a extends backwardly and outwardly in the width direction to provide a good view on a rear side as seen from the driver seat 6.

As shown in FIG. 8, the contacting wall 34a has a first communicating opening 53 formed above the exterior opening 55 and a second communicating opening 54 formed below the exterior opening 55. The first communicating opening 53 and the second communicating opening 54 communicate the pillar inside 38 with the cabin exterior. The first and second connecting openings 53 and 54 increase an amount of outside air that can be taken into the pillar inside 38.

Figure 13:
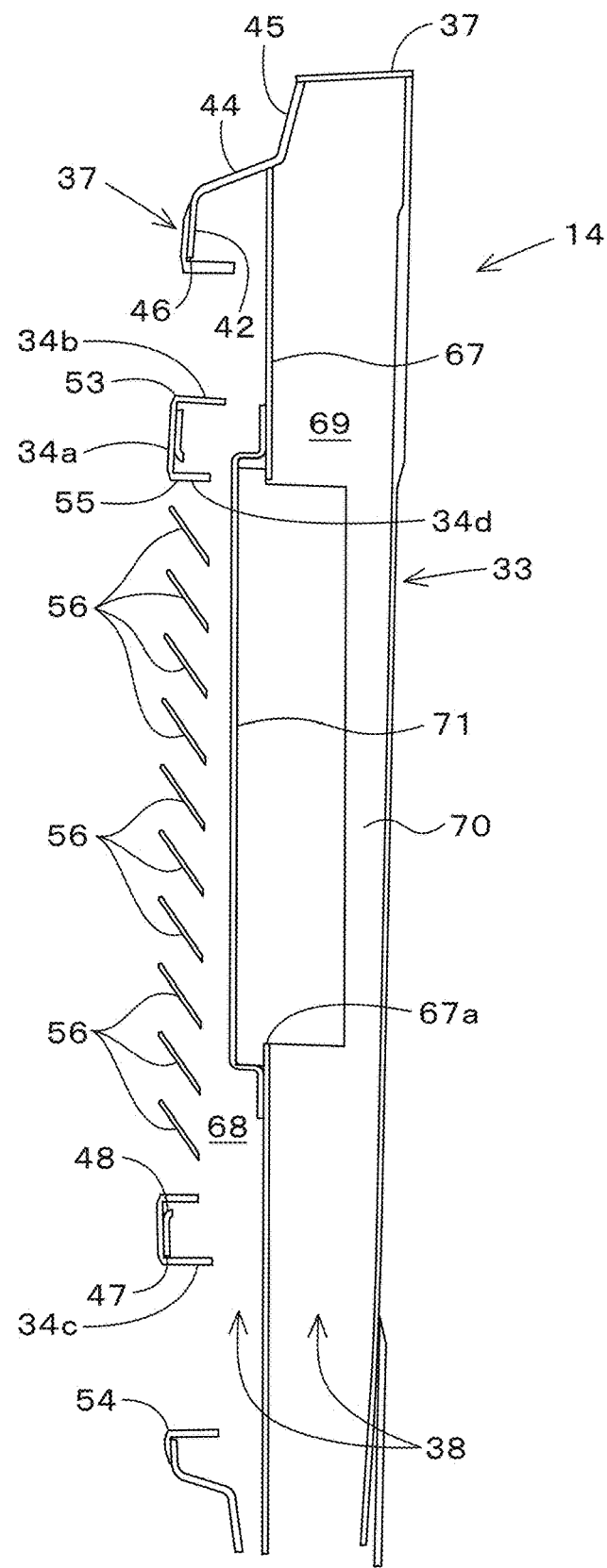
FIG. 13 is a vertical cross-sectional view of an outside-air intake portion of the rear pillar.

As shown in FIG. 13, the first communicating opening 53 is formed at a position corresponding to the first insertion hole 46, the second communicating opening 54 is formed at a position corresponding to the second insertion hole 47, and the exterior opening 55 is formed at a position corresponding to the third insertion hole 48.

As shown in FIG. 8, the first communicating opening 53 is formed in an upper portion of the contacting wall 34a, that is, formed at a portion corresponding to the upper portion 43a of the third portion 43. Thus, the first communicating opening 53 is located in a portion corresponding to the first door hinge 29 (that is, a portion covered by the first door hinge 29). As shown in FIGS. 11 and 13, a tubular first guide wall 34b is located around the first communicating opening 53, the first guide wall 34b extending through the first insertion hole 46 to the pillar inside 38.

As shown in FIG. 8, the second communicating opening 54 is formed in a lower portion of the contacting wall 34a, that is, formed at a portion corresponding to the lower portion 43b of the third portion 43. Thus, the second communicating opening 54 is located in a portion corresponding to the second door hinge 30 (that is, a portion covered by the second door hinge 30). As shown in FIGS. 12 and 13, a tubular second guide wall 34c is located around the second communicating opening 54, the second guide wall 34c extending through the second insertion hole 47 to the pillar inside 38.

Since the first communicating opening 53 corresponds to the first door hinge 29 and the second communicating opening 54 corresponds to the second door hinge 30, this configuration makes it difficult for water such as car wash water and rainwater to enter the pillar inside 38 through the first communicating opening 53 and the second communicating opening 54.

As shown in FIG. 8, the exterior opening 55 is formed between the first communicating opening 53 and the second communicating opening 54, and thus located between the first door hinge 29 and the second door hinge 30.

As shown in FIGS. 10 and 13, a tubular third guide wall 34d is located around the exterior opening 55, the tubular third guide wall 34d extending through the third insertion hole 48 to the pillar inside 38. In the third guide wall 34d, a plurality of louver walls 56 are formed to be arranged at intervals in the vertical direction. Each of the louver walls 56 has an inclined shape extending downward in a direction from the cabin exterior to the pillar inside 38, and is fixed to the third guide wall 34d. The upper and lower neighboring louver walls 56 overlap with each other when viewed from the front. The louver walls 56 prevent the water such as car wash water and rainwater from entering the pillar inside 38 through the exterior opening 55.

As shown in FIG. 9, the third member 35 is located in the cabin interior, and extends from an upper edge to a lower edge of the first member 33. As shown in FIGS. 10 to 12, the third member 35 includes an inner wall 57 facing inward in the width direction and a front wall 58 extending outward in the width direction from a front edge of the inner wall 57.

Figure 14:
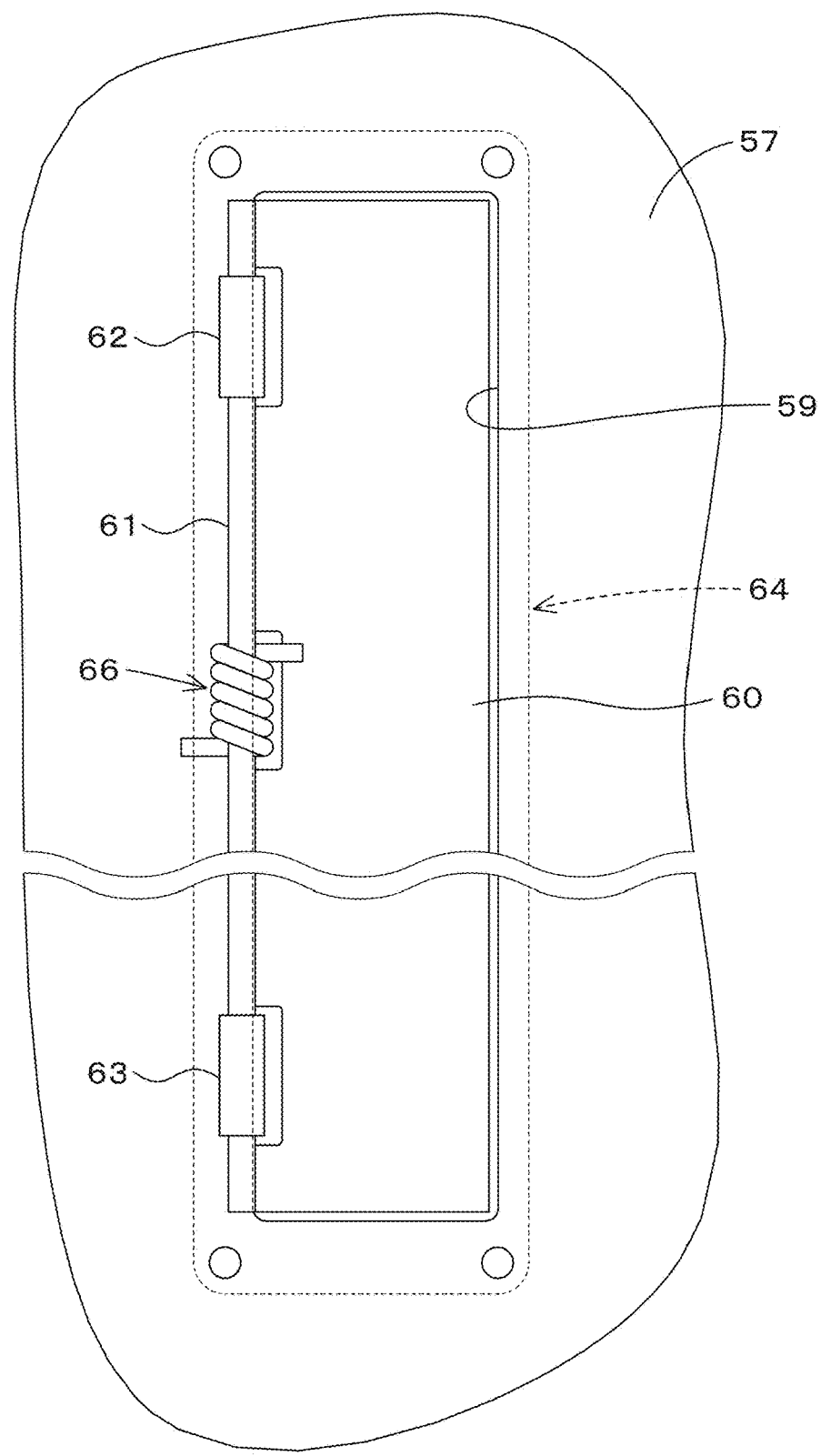
FIG. 14 is a side view of an interior opening and a lid.

As shown in FIGS. 9 and 14, an interior opening 59 is formed in the interior wall 57 to communicate the pillar inside 38 with the cabin interior. In particular, the interior opening 59 is formed through the interior wall 57 and is formed from an upper portion of the interior wall 57 to a lower portion. The outside air that has been taken into the pillar inside 38 through the exterior opening 55 can be taken into the cabin interior through the interior opening 59. That is, the rear pillar 14 performs a ventilation function. This makes it possible to ventilate the cabin interior without an openable quarter glass. In this manner, the four-pillar cabin frame 8 without a center pillar can be used to provide a good view of a side area from the cabin 1.

As shown in FIG. 11, a width directional outward end of an upper portion of the front wall 58 is connected to the upper portion 41a of the door contacting portion 41. In addition, as shown in FIG. 12, a width directional outward end of the lower portion of the front wall 58 is connected to a lower portion 41b of the door contacting portion 41. As shown in FIG. 10, the middle portion of the front wall 58 is connected to the front wall 51 of the first member 33.

As shown in FIGS. 10 to 12 and FIG. 14, a lid 60 is located on the inner wall 57 on the pillar inside 38 side, the lid 60 being configured to openably close the interior opening 59. A front end of the lid 60 is pivotally supported by the inner wall 57 with a pivot axis 61 or the like, and can be opened and closed. The pivot axis 61 is located in the pillar inside 38 along a front edge of the interior opening 59. The pivot axis 61 is formed of a round bar material having a length spanning between upper and lower ends of the lid 60.

As shown in FIG. 14, the pivot axis 61 is supported at an upper portion thereof by a first support portion 62, and at a lower portion thereof by a second support portion 63. In particular, as shown in FIG. 11, the first support portion 62 is arranged at an upper portion adjacent to a front-edge of the interior opening 59 and is fixed to the interior wall 57, and has a tubular portion 62a through which the pivot axis 61 is inserted rotatably around its axis center. As shown in FIG. 12, the second support 63 is arranged at a lower portion adjacent to the front-edge of the interior opening 59 and is fixed to the inner wall 57, and has a tubular portion 63a through which the pivot axis 61 is inserted rotatably around its axis center.

Figure 15:
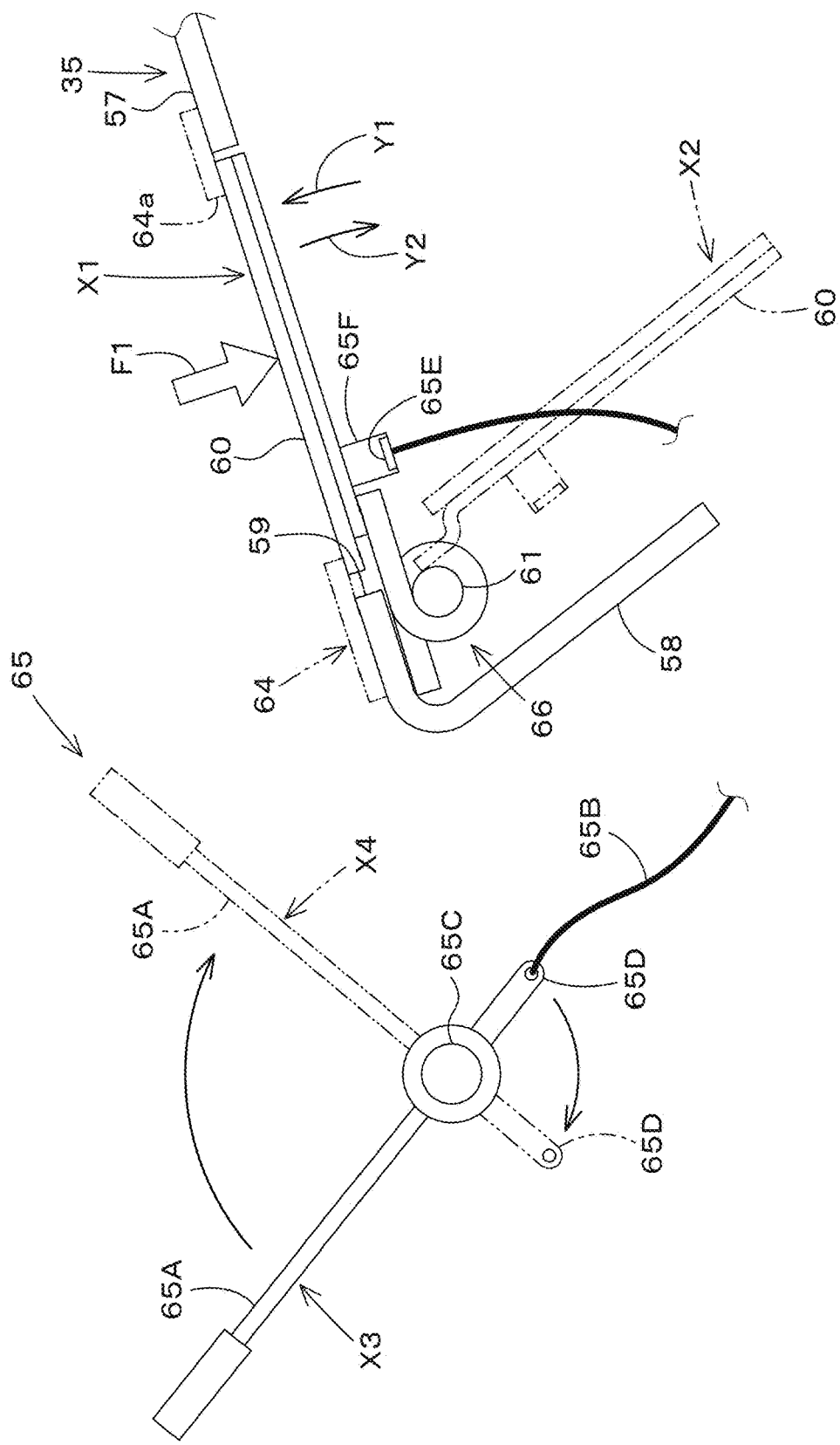
FIG. 15 is a schematic view illustrating an opening-closing operation mechanism of the lid.

As shown in FIG. 15, the lid 60 is swingable between a closing position (shown by a solid line) X1, which closes the interior opening 59, and an opening position (shown by a double-dotted chain line) X2 at which the lid 60 swinging from the closing position X1 toward the pillar inside 38 is positioned to open the interior opening 59.

As shown in FIGS. 9, 14, and 15, a regulation wall 64 is located on the inner wall 57 on the cabin interior side to prevent the lid 60 at the closing position X1 from further swinging toward the cabin interior side. The regulation wall 64 is formed of a plate material and is attached to the inner wall 57 with bolts or the like. As shown in FIG. 9, the regulation wall 64 is provided with an opening 64a that is slightly smaller than the interior opening 59 and has a size corresponding to the interior opening 59. When the lid 60 is swung to the opening position X2 at which the interior opening 59 is opened, the interior opening 59 is communicated with the cabin interior through the opening 64a.

As shown in FIG. 15, a lid operation mechanism 65 is provided to operate the lid 60. The lid operation mechanism 65 is capable of operating the lid 60 from the closing position X1 to the opening position X2 and capable of holding the lid 60 at the opening position X2. In particular, the lid operation mechanism 65 includes an operation lever 65A and an operation wire 65B. The operation lever 65A is provided in the vicinity of the driver seat 6 and is rotatably supported by a lever support shaft 65C. The operation wire 65B has one end connected to an arm 65D that rotates integrally with the operation lever 65A. A hooking tool 65E is coupled to the other end of the operation wire 65B. The hooking tool 65E is hooked to a hooking portion 65F fixed on the lid 60. When the operation lever 65A is rotated from a first position X3 shown by a solid line to a second position X4 shown by a virtual line, the operation wire 65B is pulled to swing the lid 60 from the closing position X1 to the opening position X2. When the operating lever 65A is held at the second position X4, the lid 60 is held at the opening position X2. The lid operation mechanism 65 is not limited to the mechanism described above.

As shown in FIGS. 14 and 15, a biasing member 66 is provided at the middle portion of the pivot axis 61 to press the lid 60 in a direction from the opening position X2 toward the closing position X1 (that is, in a direction indicated by an arrowed line Y1 in FIG. 15). The pressing member 66 includes a torsion coil spring, which has a coil fitted on the pivot axis 61, and has one end abutting against the lid 60 and the other end abutting against the inner wall 57. The lid 60 can be swung in an opening direction (that is, in a direction indicated by an arrowed line Y2 in FIG. 15) against a biasing force of the biasing member 66 when the operation wire 65B is bent or the hooking portion 65F moves relative to the hooking tool 65E.

As shown in FIG. 15, when the ventilation is not performed, the lid 60 is placed at the closing position X1 and the interior opening 59 is closed; however, in this state, when internal pressure of the cabin interior increases because the door 27 is closed from an opening state, the lid 60 is pushed by the internal pressure F1 and swung to the opening direction (that is, in the direction of the arrowed line Y2) against the biasing force of the biasing member 66. In this manner, the air in the cabin interior is released, and the door 27 of the cabin 1, which is airtight inside, can be closed smoothly.

As shown in FIG. 9, the fourth member 36 extends along the first member 33 and the third member 35 from their upper ends to their lower ends. As shown in FIGS. 10 to 12, the fourth member 36 includes a partition wall 67 that partitions the pillar inside 38 back and forth. The partition wall 67 extends from the outer wall 39 of the first member 33 to a rear portion of the inner wall 57 of the third member 35. As shown in FIGS. 10 to 12, a space on the front side of the partition wall 67 in the pillar inside 38 is a ventilation path 68 to distribute the outside air taken from the exterior opening 55 or the like to the interior opening 59. A space on the rear side of the partition wall 67 in the pillar inside 38 is an outside-air inlet path 69 to distribute the outside air taken from the exterior opening 55 to an outside-air inlet 37a to be described below.

As shown in FIGS. 10 and 13, a distribution opening 67a is formed in the partition wall 67 to distribute air from the ventilation path 68 to the outside-air inlet path 69. The distribution opening 67a is formed along with the exterior opening 55 from its upper portion to its lower portion. The distribution opening 67a is formed from one width directional end portion of the partition wall 67 to the other width directional end portion of the partition wall 67. An outside-air filter 70 is inserted through the distribution opening 67a to remove dust in the outside air flowing from the exterior opening 55 to the outside-air inlet path 69. The outside-air filter 70 is attached to the partition wall 67 with a breathable attachment member 71. Accordingly, the outside air taken from the exterior opening 55 into the ventilation path 68 can be distributed through the outside-air filter 70 to the outside-air inlet path 69.

As shown in FIGS. 10 to 12, the fourth member 36 includes a side wall 72 extending from the partition wall 67 and a connection wall 73 extending from the side wall 72. In particular, the side wall 72 is extended backward from a width directional inward end of the partition wall 67 and closes a space between the rear wall 52 of the first member 33 and the inner wall 57 of the third member 35. The connection wall 73 is extended outward in the width direction from a rear end of the side wall 72 and is connected to the rear wall 52 of the first member 33.

Figure 5:
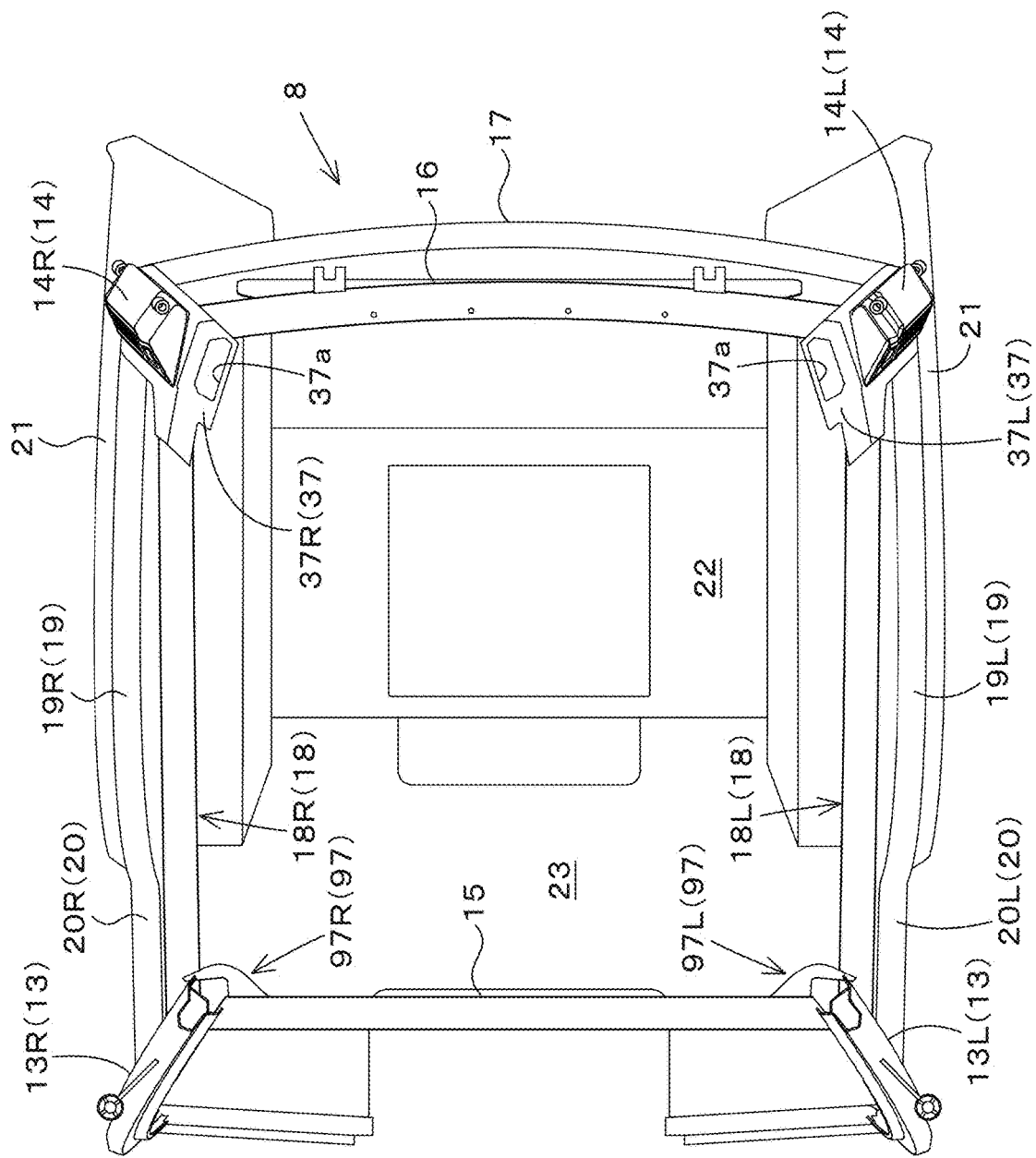
FIG. 5 is a plan view of the cabin frame.

As shown in FIG. 8, the fifth member 37 is located at upper ends of the first member 33, the third member 35, and the fourth member 36, and defines an upper wall that is an upper end wall of the rear pillar 14. The fifth member 37 is referred to as the upper wall. As shown in FIG. 5, the upper wall of the first rear pillar 14L is referred to as a first upper wall 37L and the upper wall of the second rear pillar 14R is referred to as a second upper wall 37R.

The upper wall 37 is formed integrally on the plate material forming the first member 33. The upper wall 37 has the outside-air inlet 37a that communicates the pillar inside 38 (that is, the outside-air inlet path 69) to the inside of the roof 9. The outside air taken into the outside-air inlet path 69 by driving a blower of the air conditioner 26 is introduced into the inside of the roof 9 through the outside-air inlet 37a and taken into the air conditioner 26.

Figure 16:
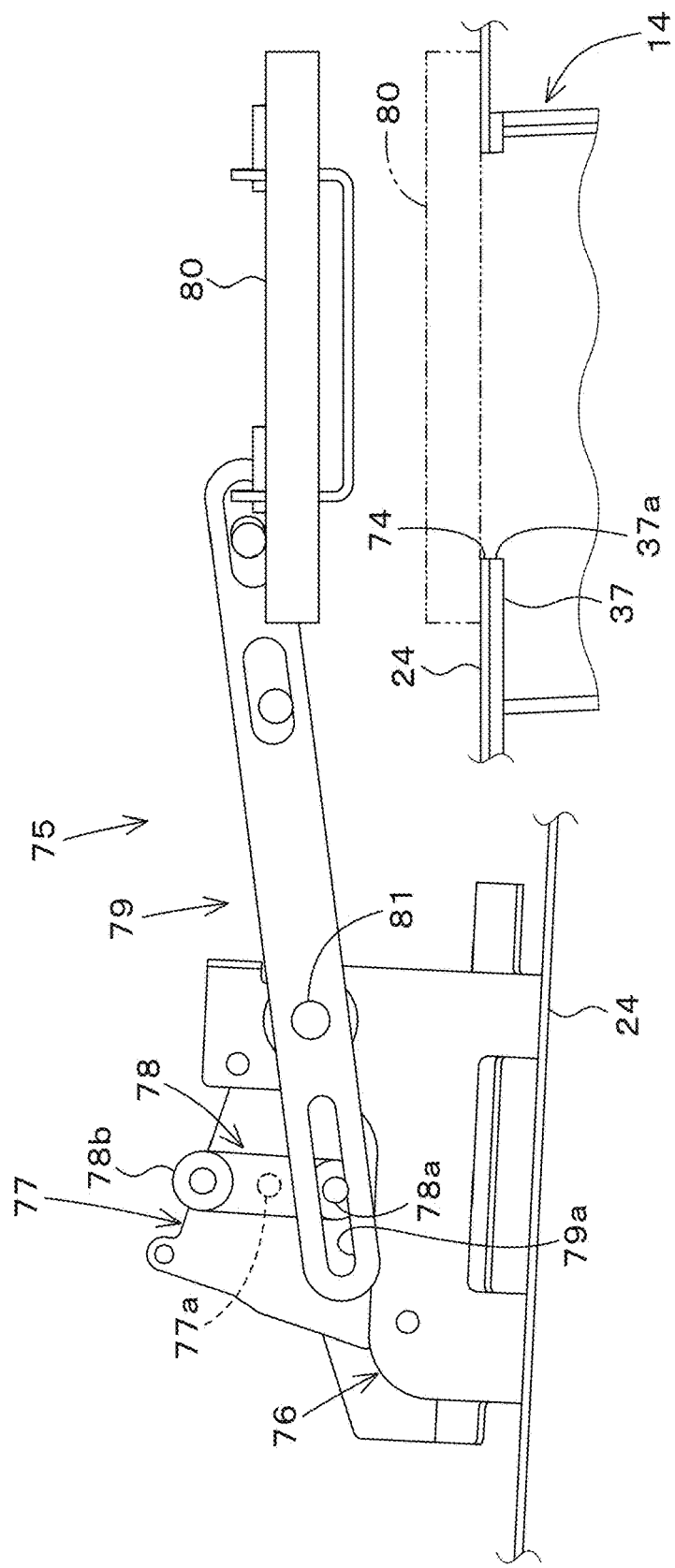
FIG. 16 is a side view illustrating the opening-closing mechanism of an outside-air inlet.

As shown in FIG. 16, the inner roof 24 has a communicating hole 74 that is communicated with the outside-air inlet 37a. The outside-air inlet 37a is communicated with the inside of the roof 9 through the communicating hole 74. Inside the roof 9, an opening/closing mechanism 75 that opens and closes the air inlet 37a is located. The opening/closing mechanism 75 includes a support bracket 76, a lifting motor 77, a moving member 78, a lifting arm 79, and an opening/closing lid 80. The support bracket 76 is attached to the inner roof 24. The lifting motor 77 is attached to the support bracket 76. The moving member 78 is attached to a drive shaft 77a of the lifting motor 77 to be integrally rotatable with the drive shaft 77a. An engagement pin 78a is located on one end of the moving member 78, and a pressing member 78b is located on the other end. The lifting arm 79 is pivotally supported at a longitudinally intermediate portion thereof by the support bracket 76 on a support shaft 81. A long hole 79a is formed in one end portion of the lifting arm 79, and the engagement pin 78a is inserted to the long hole 79a. The other end portion of the lifting arm 79 is interlocked with the opening/closing lid 80. The opening/closing mechanism 75 is configured so that, when the drive shaft 77a of the lifting motor 77 is rotated from a state shown by a solid line in FIG. 16, the moving member 78 is rotated and the one end portion of the lifting arm 79 is pulled up by the engaging pin 78a. When the one end portion of the lifting arm 79 is pulled up, the opening/closing lid 80 is lowered, and the outside-air inlet 37a and the communicating hole 74 are closed as shown by a solid line in FIG. 16. In this state, the pressing member 78b presses the lifting arm 79.

In this preferred embodiment, the first rear pillar 14L and the second rear pillar 14R have a similar structure, and a ventilation structure and an air-conditioner outside air introduction structure are provided in each of the first rear pillar 14L and the second rear pillar 14R, but the ventilation structure and the air-conditioner outside air introduction structure may be provided in only one of the first rear pillar 14L and the second rear pillar 14R.

"Solid borne sound" derived from vibrations of the prime mover E1 and the like propagating through mounts and the like that vibro-isolatingly support the cabin 1, and "air borne sound" derived from vibrations propagating through the door 27, front panel 31, rear panel 32, or the like are transmitted into the cabin interior. These propagation sounds generate so-called "booming noises" in the cabin. As shown in FIG. 7, the cabin 1 according to this preferred embodiment includes a resonator 86 (also referred to as an air-column resonator or a noise canceler by air-column resonance) configured to reduce the "booming noises" generated in the cabin interior.

As shown in FIG. 7, the resonator 86 is located in the inner roof 24. In addition, the resonator 86 is located above the driver seat 6.

The inner roof 24 and the outer roof 25, which define the roof 9, are formed of resin. The resonator 86 is integrally formed on the inner roof 24 through blow molding or the like of the inner roof 24. In other words, the resonator 86 is integrally molded in the inner roof 24 with the resin forming the inner roof 24. The resonator 86 may be integrally formed in the inner roof 24 with the resin forming the inner roof 24 by forming the inner roof 24 through rotational molding or the like.

By integrally forming the resonator 86 in the inner roof 24, an additional component for attaching the inner roof 24 is not required, and the resonator 86 can be installed in the inner roof 24 without additional space and costs.

Figure 17:
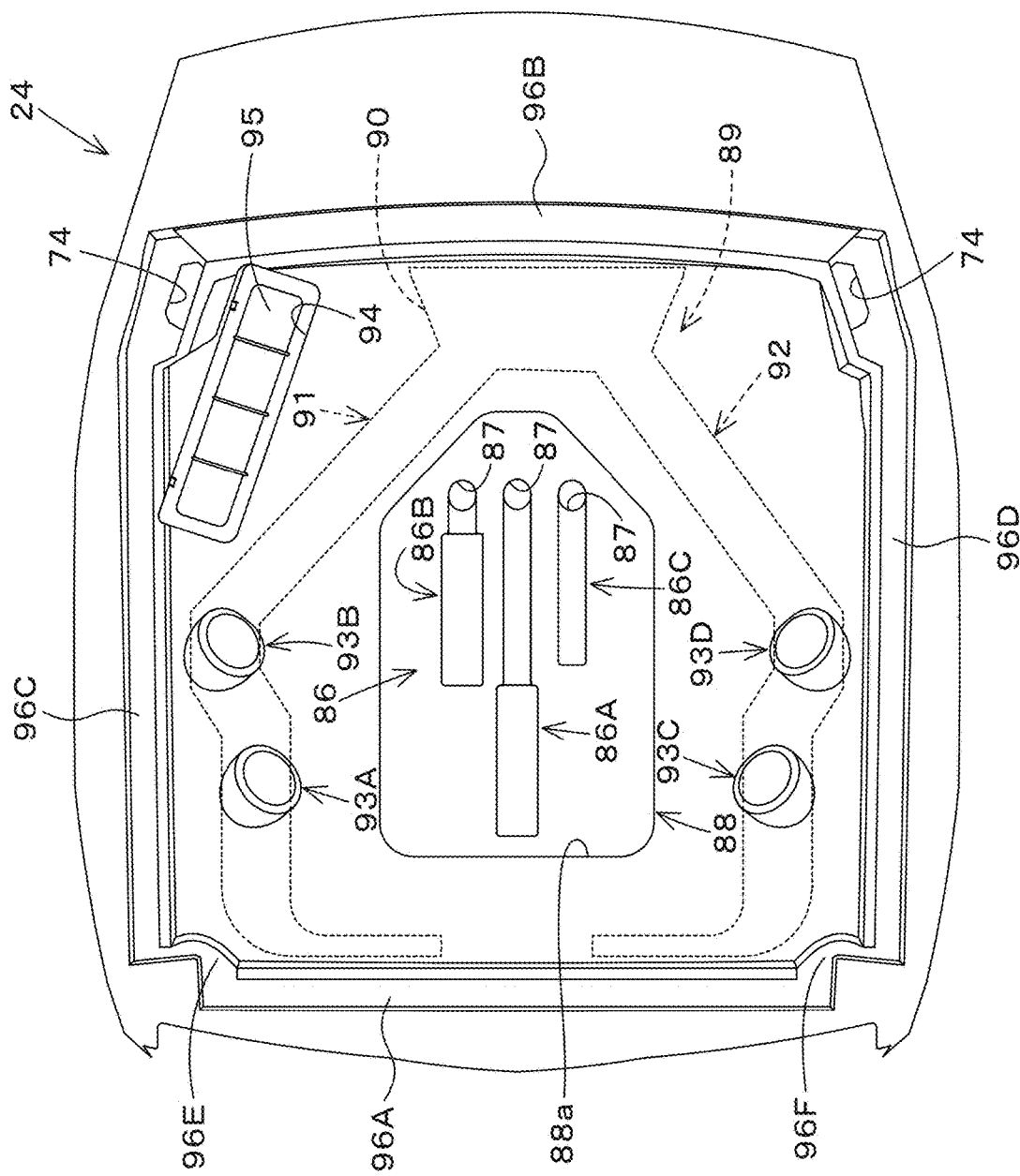
FIG. 17 is a bottom view of an inner roof.
Figure 18:
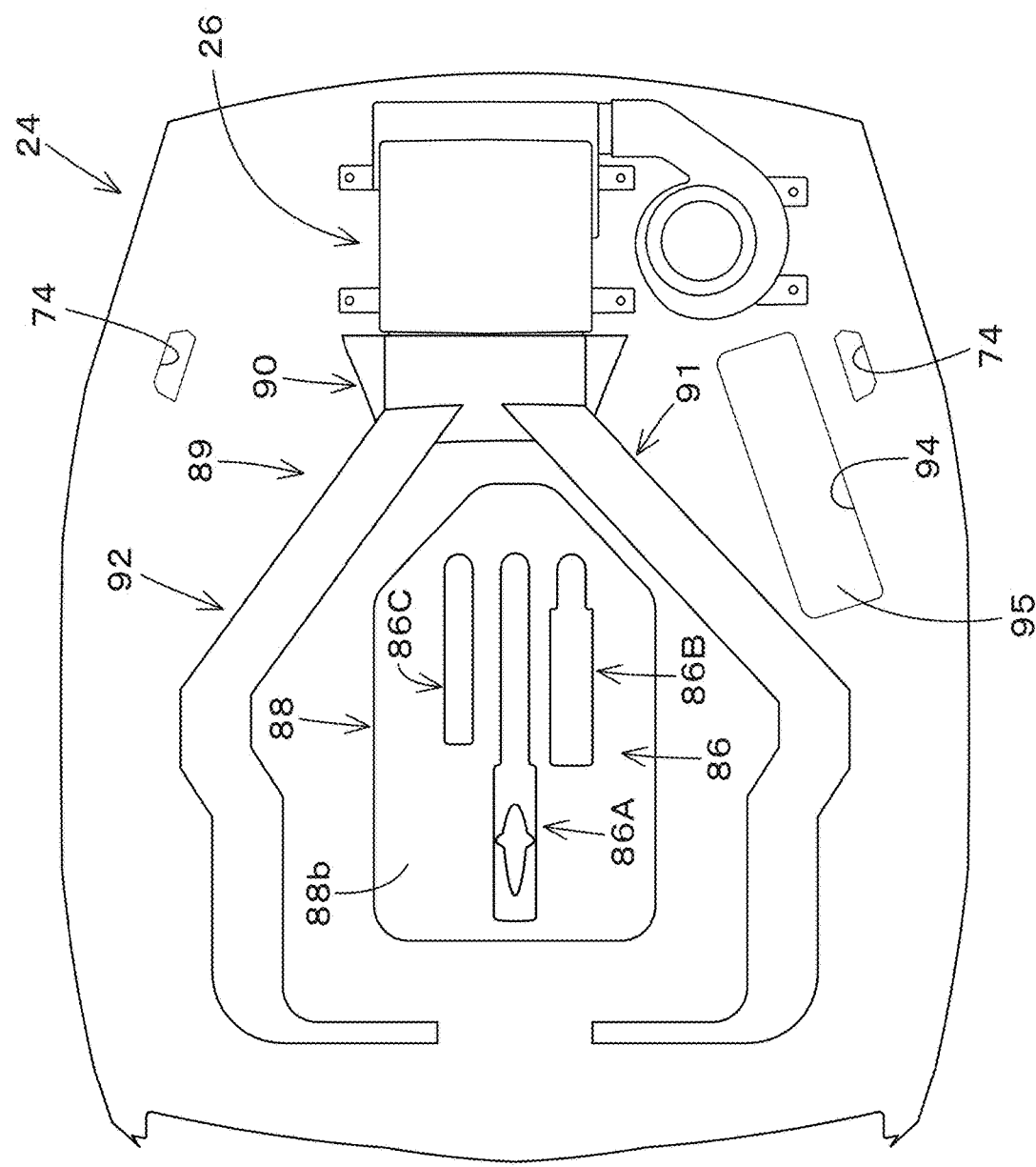
FIG. 18 is a plan view of the inner roof.

As shown in FIGS. 17 and 18, the resonator 86 is provided at the center of the inner roof 24 in the width direction. In addition, the resonator 86 includes at least one resonator tube. In the present preferred embodiment, the resonator 86 includes a plurality of resonance tubes 86A to 86C having different lengths. The resonance tubes 86A to 86C are arranged side by side in the width direction of the cabin 1. Each of the resonance tubes 86A to 86C preferably has a tubular form that is long in the fore-and-aft direction A3 (that is, has an axial center extending in the fore-and-aft direction A3) with a front end closed, and is provided at a rear end thereof with an opening hole 87 that opens to the cabin interior (i.e., downward).

The plurality of resonance tubes include three resonance tubes: a first resonance tube 86A, a second resonance tube 86B, and a third resonance tube 86C, for example. The first resonance tube 86A is located at the width-directional center portion of the inner roof 24. The second resonance tube 86B is located leftward of the first resonance tube 86A at an interval. The third resonance tube 86C is located rightward of the first resonance tube 86A at an interval. The number of resonance tubes is not limited thereto. That is, it may be one, two, four or more.

As shown in FIGS. 17 and 18, the first resonance tube 86A, the second resonance tube 86B, and the third resonance tube 86C extend backward from substantially the same position in the fore-and-aft direction A3. That is, the openings 87 of the resonance tubes 86A to 86C are arranged side by side in the width direction at the same position in the fore-and-aft direction A3. In terms of the length, the first resonance tube 86A is the longest, and the second resonance tube 86B is slightly longer than the third resonance tube 86C.

Figure 19:
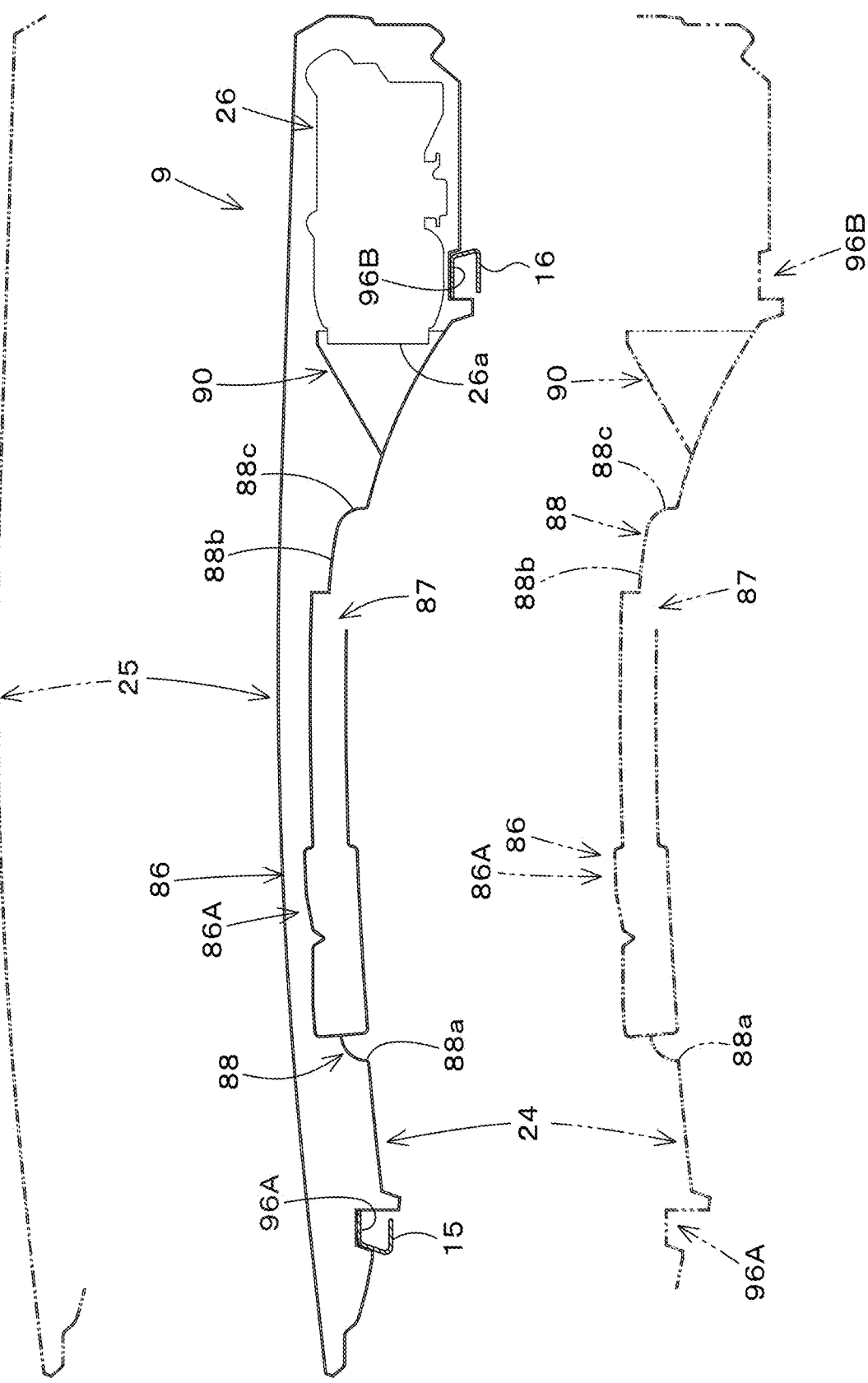
FIG. 19 is a side cross-sectional view illustrating a cross section of a center portion of a roof in a width direction.
Figure 21:
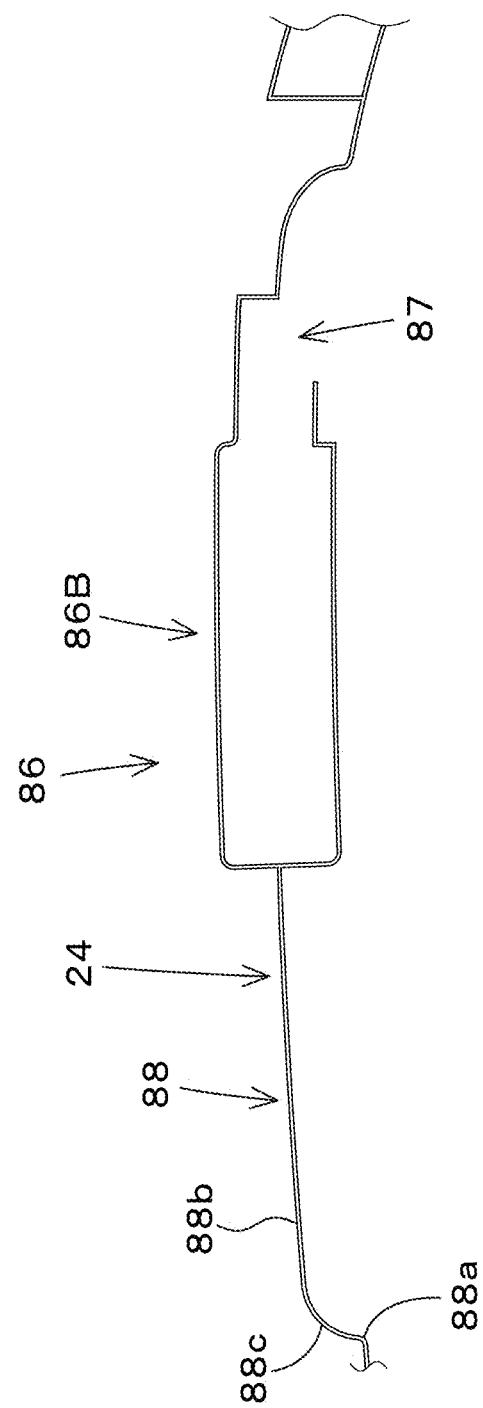
FIG. 21 is a side cross-sectional view of a second resonance tube.
Figure 22:
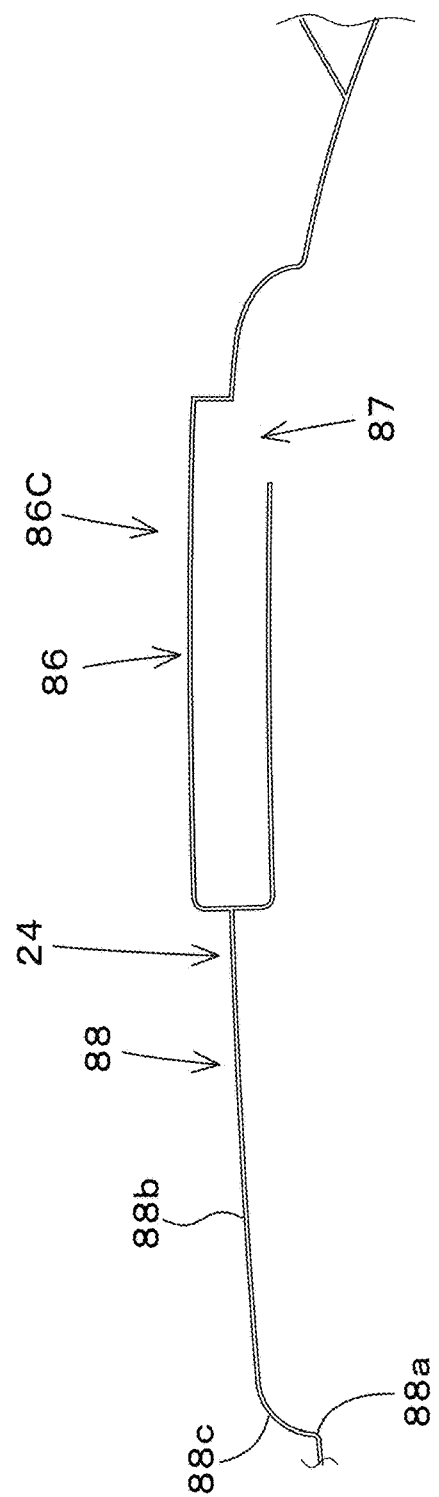
FIG. 22 is a side cross-sectional view of a third resonance tube.

As shown in FIG. 19, the first resonance tube 86A preferably has a tubular shape with the front portion having a larger diameter than the rear portion. As shown in FIG. 21, the second resonance tube 86B is also formed in a tubular shape with the front portion having a larger diameter than the rear portion. As shown in FIG. 22, the third resonance tube 86C is formed in a tubular shape with a constant diameter from the front portion to the rear portion.

The resonator 86 (including the first to third resonance tubes 86A to 86C) cancels high peak frequencies to reduce "booming noises." To cancel the high peak frequencies, the resonator 86 is configured so that the noises entering through the opening hole 87 are reflected on the inner wall surface, and then the noises of the natural frequency of the resonators 86 coming out through the opening hole 87 become in reverse phase with the noises inside the cabin so as to cancel each other. Since the resonant point of the intruding noise wave changes depending on the volume of resonator 86 (that is, the resonance tubes), the "booming noises" with different frequencies can be reduced by the plurality of resonance tubes. The resonator 86 can reduce the "booming noises" near an operator's ear because the opening holes 87 are located near the operator's ear.

Figure 20:
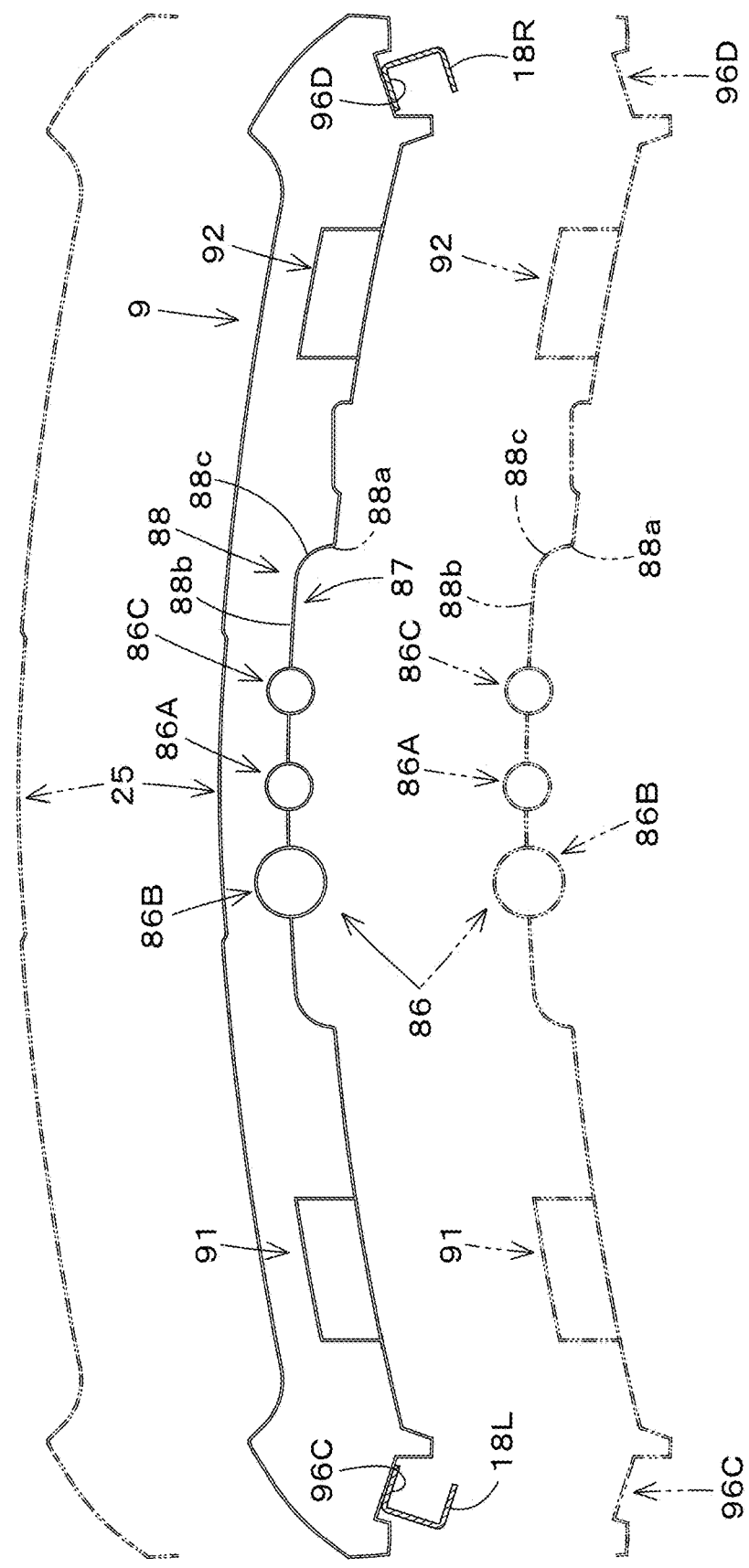
FIG. 20 is a back cross-sectional view illustrating a cross section of the center portion of the roof in a fore-and-aft direction.

As shown in FIGS. 19 and 20, the inner roof 24 has a downwardly opening recess 88 formed by upwardly recessing the wall forming the inner roof 24. The recess 88 includes an upper wall 88*b* located above a peripheral edge of an opening 88*a*, and a rising wall 88*c* that rises upward from the peripheral edge of the openings 88*a* and are joined to the upper wall 88*b*. The resonator 86 (including the first to third resonance tubes 86A to 86C) are integrally formed with the upper wall 88*b* of the recess 88.

By integrally forming the resonator 86 with the upper wall 88*b* of the recess 88, the resonators 86 are prevented from narrowing a head clearance of the operator.

As shown in FIGS. 19 to 22, the upper portions (that is, upper halves) of the resonators 86 protrude upward from the upper wall 88*b*, and the lower portions (that is, lower halves) of the resonator 86 protrude downward from the upper wall 88*b*. That is, the resonator 86 protrudes both upward and downward from the upper wall 88*b* of the recess 88. In this manner, the resonator 86 does not protrude downward from the opening 88*a* of the recess 88, thereby ensuring the head clearance above the operator.

As shown in FIGS. 17 and 18, a duct 89 is formed integrally with the inner roof 24 to distribute conditioned air blown from the air conditioner 26. The duct 89 includes a first duct portion 90, a second duct portion 91, and a third duct portion 92. The first duct portion 90 is located rearward from the recess 88 and connects to an air outlet 26*a* of the air conditioner 26. The second duct portion 91 includes a rear portion extending diagonally forwardly leftward from a left front portion of the first duct portion 90, and a middle portion extending forward on the left side of the recess 88. A front portion of the second duct portion 91 extends inward in the width direction in front of the recess 88. The third duct portion 92 includes a rear portion extending diagonally forwardly rightward from a right front portion of the first duct portion 90, and a middle portion extending forward on the right side of the recess 88. The front portion of the third duct portion 92 extends inward in the width direction in front of the recess 88.

Since the plurality of resonator tubes extending in the fore-and-aft direction A3 are juxtaposed in the width direction, the resonator 86 including the plurality of resonator tubes to reduce the noises at the operator's ear can be located between the second duct portion 91 and the third duct portion 92.

In the inner roof 24 on the cabin interior side, first to fourth outlet portions 93A to 93D are located to blow the conditioned air flowing inside the duct 89 to the cabin interior. The first outlet portion 93A and the second outlet portion 93B are located on the left side of the recess 88 and below the second duct portion 91 in communication with the second duct portion 91. The third outlet portion 93C and the fourth outlet portion 93D are located on the right side of the recess 88 and below the third duct portion 92 in communication with the third duct portion 92.

A rear portion of the recess 88 is tapered to have a width reduced backward such as to match the shape of the rear portions of the second duct portion 91 and the third duct portion 92.

As shown in FIGS. 17 and 18, an inner air inlet 94 is formed on a left rear portion of the inner roof 24 to communicate the cabin interior with the inside of the roof 9.

An inner air filter 95 is fitted in the inner air inlet 94. The inner air inlet 94 is openably closed from the inside of the roof 9 by an opening/closing lid (not shown in the drawings).

As shown in FIG. 17, the inner roof 24 includes first to sixth grooves 96A to 96F open downward at a lower surface of the inner roof 24. The first groove 96A is formed in a front portion of the inner roof 24 and extends in the width direction, and fits into the front upper frame 15 (see FIG.

19). The second groove 96B is formed in the rear portion of the inner roof 24 and extends in the width direction, and fits into the rear upper frame 16 (see FIG. 19). The third groove 96C is formed by extending forward from a left end of the second groove 96B and fits into the first side upper frame 18L and the first rear pillar 14L (see FIG. 20). The fourth groove 96D is formed by extending forward from a right end of the second groove 96B and fits into the second side upper frame 18R and the second rear pillar 14R (see FIG. 20). The fifth groove 96E connects a left end of the first groove 96A to a front end of the third groove 96C. The sixth groove 96F connects a right end of the first groove 96A to a front end of the fourth groove 96D.

Sealing members are each interposed between each of the first to sixth grooves 96A to 96F and each of the front upper frame 15, the first side upper frame 18L, the second side upper frame 18R, the first rear pillar 14L, the second rear pillar 14R, and the rear upper frame 16. Thus, upper surfaces of the front upper frame 15, the first side upper frame 18L, the second side upper frame 18R, the first rear pillar 14L, the second rear pillar 14R, and the rear upper frame 16 are sealing surfaces to which the sealing members are contacted or bonded.

As shown in FIG. 4, the front upper frame 15 preferably has a curved shape protruding upward in front view. In particular, the front upper frame 15 includes a rearwardly opening groove-shaped member, and preferably has a curved shape extending upward from left and right ends toward the center in the width direction (toward the center in its longitudinal direction). The front upper frame 15 preferably has a curved shape (that is, an arc shape) that is uniform or substantially uniform from one end to the other. In addition, the front upper frame 15 is tilted so that a front surface extends upwardly backward.

As shown in FIG. 4, a lower edge 9a of a front end of the roof 9, corresponding to the front upper frame 15, preferably has a curved shape extending along the curved shape of the front upper frame 15.

As shown in FIGS. 3, 4 and 5, the first front pillar 13L and the second front pillar 13R preferably have a curved shape protruding outward in front and side views. In particular, the first front pillar 13L preferably has a curved shape protruding diagonally forward to the left, and the second front pillar 13R preferably has a curved shape protruding diagonally forward to the right.

The front panel 31 preferably has a curved shape extending along the first front pillar 13L and the second front pillar 13R. In particular, the front panel 31 preferably has a spherical shape that is convex toward the front, and an upper edge thereof is bonded to the front upper frame 15 with a sealing member, a left side edge thereof is bonded to the first front pillar 13L with a sealing member, and a right side edge thereof is bonded to the second front pillar 13R with a sealing member.

Figure 23:
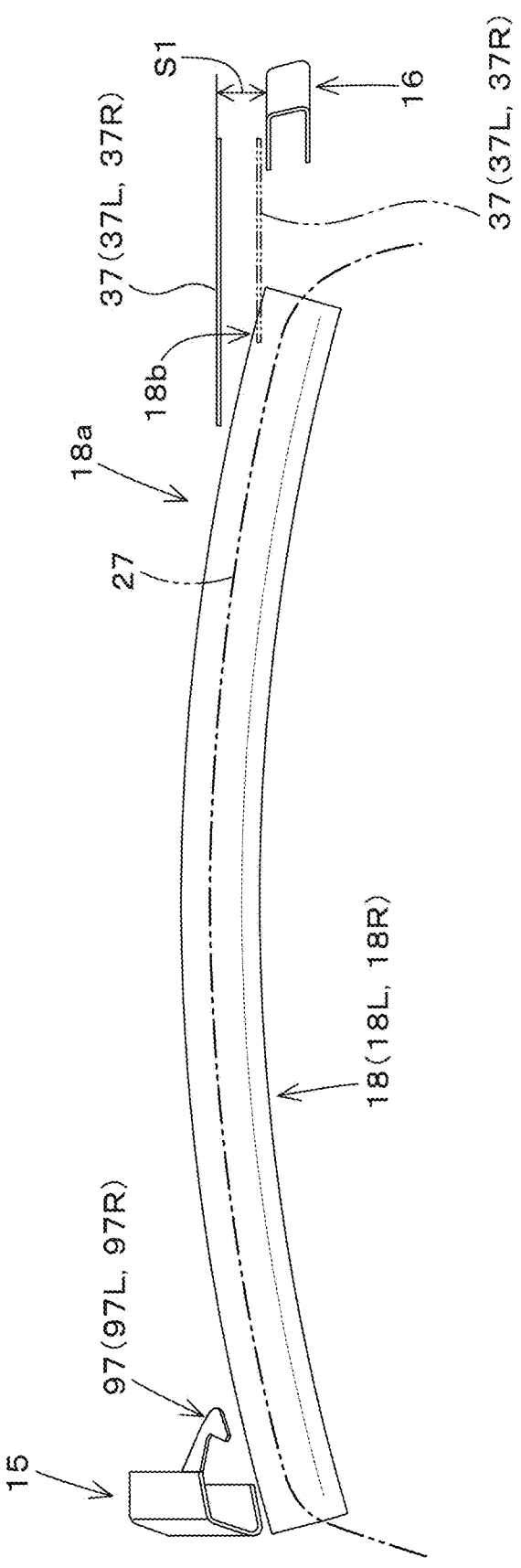
FIG. 23 is a side view of an upper portion of the cabin frame.
Figure 24:
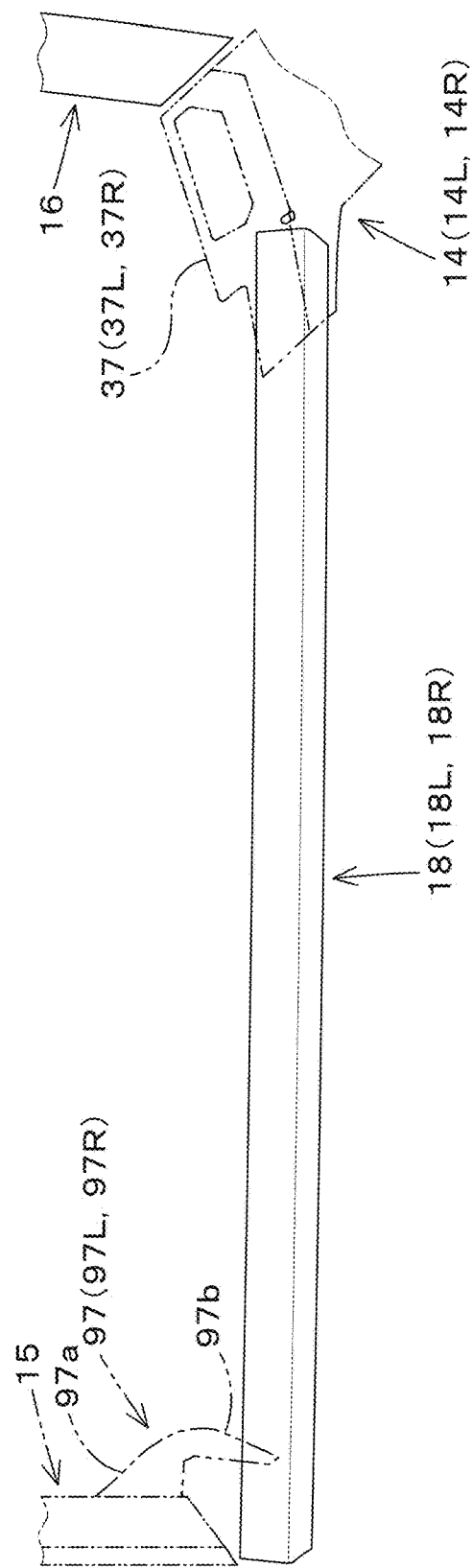
FIG. 24 is a plan view of the upper portion of the cabin frame.

As shown in FIG. 3 and FIG. 23, the side upper frames 18 (that is, the first side upper frame 18L and the second side upper frame 18R) preferably have curved shapes protruding upward in a side view. In particular, the side upper frames 18 include groove-shaped members (see FIG. 27) that open inward in the width direction, and each preferably have a curved shape extending upward from front and rear ends toward the center in the fore-and-aft direction (that is, the center in its longitudinal direction). The side upper frames 18 preferably have curved shapes (that is, arc shapes) uniform from one end thereof to the other. In addition, the side upper frames 18 (that is, the first side upper frame 18L and the second side upper frame 18R) are inclined upwardly and inwardly in the width direction. In particular, the front upper frame 15 includes a side surface inclined upwardly and inwardly in the width direction.

As shown in FIG. 3, the roof 9 is provided with width directional sides thereof with lower edges 9b curved along the respective curved side upper frames 18. This allows a side shape of the roof 9 to be matched to the shape of the hood.

Figure 25:
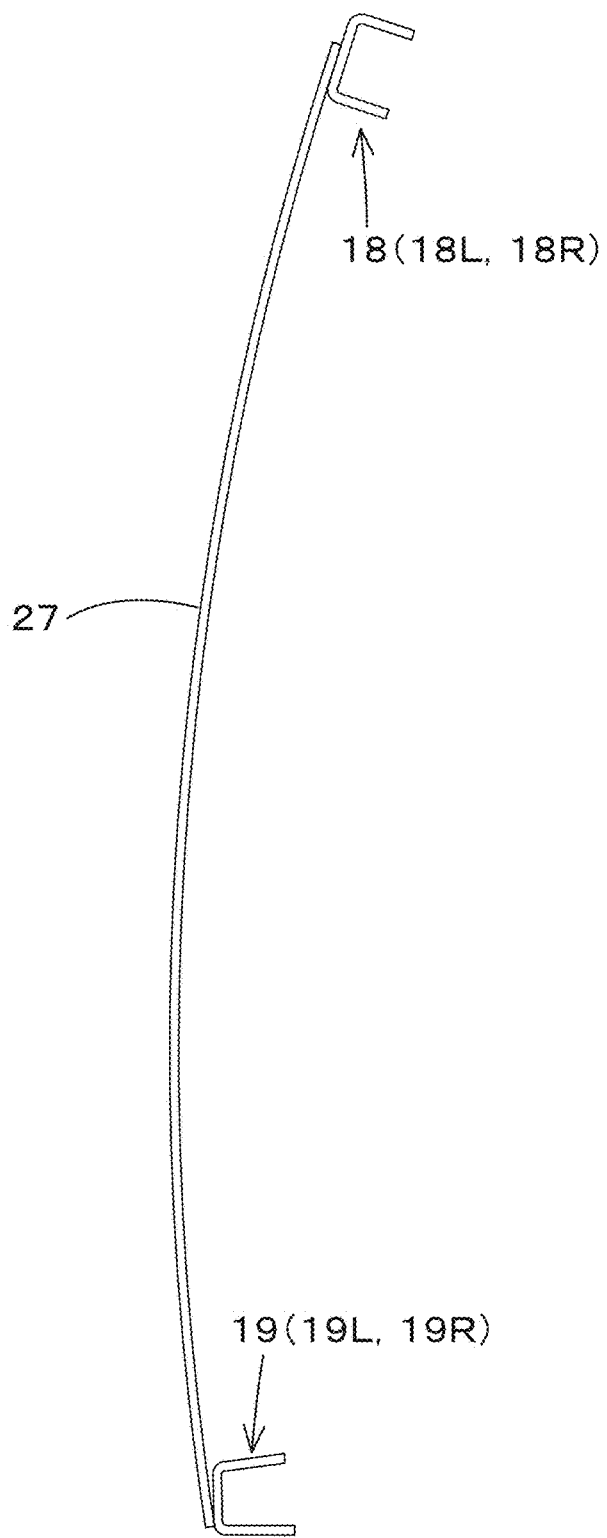
FIG. 25 is a back cross-sectional view of a middle portion of the cabin frame in the fore-and-aft direction.

As shown in FIG. 25, the doors 27 preferably have curved shapes (that is, a spherical shape) that are convex outward in the width direction, and contact to the frame member forming the passenger entrances 28 via sealing materials.

By forming both the front upper frame 15 and the side upper frames 18 to have curved shapes (that is, round shapes) that protrude upward, the strength of the cabin 1 (that is, the cabin frame 8) can be improved. In addition, since the side upper frames 18 have curved shapes that protrude upward and are inclined to extend upwardly and inwardly in the width direction, the side upper frames 18 fit to the curved shapes of the doors 27 without bulging outward in the width direction. As the result, the side upper frames 18 may extend straight from the front pillars 13 to the rear pillars 16 in a plan view, and in a case where manufacturing the cabins 1 with different lengths in the fore-and-aft direction, there is no need to form the side upper frames 18 with different lengths, but it can be handled by simply cutting the side upper frames 18. In addition, since the front upper frame 15 and the side upper frame 18 are both rounded in shape, the view can be improved in looking diagonally upward from the front, left and right from the cabin interior.

As shown in FIG. 5, a first seal catcher 97L is provided at the corner between the front upper frame 15 and the first side upper frame 18L, and a second seal catcher 97R is provided at a corner between the front upper frame 15 and the second side upper frame 18R. A sealing member contacts to the first seal catcher 97L, the sealing member being arranged extending from one side (that is, a left side) of an upper surface of the front upper frame 15 to an upper surface of the first side upper frame 18L. A sealing member contacts to the second seal catcher 97R, the sealing member being arranged extending from the other side (that is, a right side) of the upper surface of the front upper frame 15 to the upper surface of the second side upper frame 18R.

The first seal catcher 97L and the second seal catcher 97R are also collectively referred to as seal catchers 97.

Figure 26:
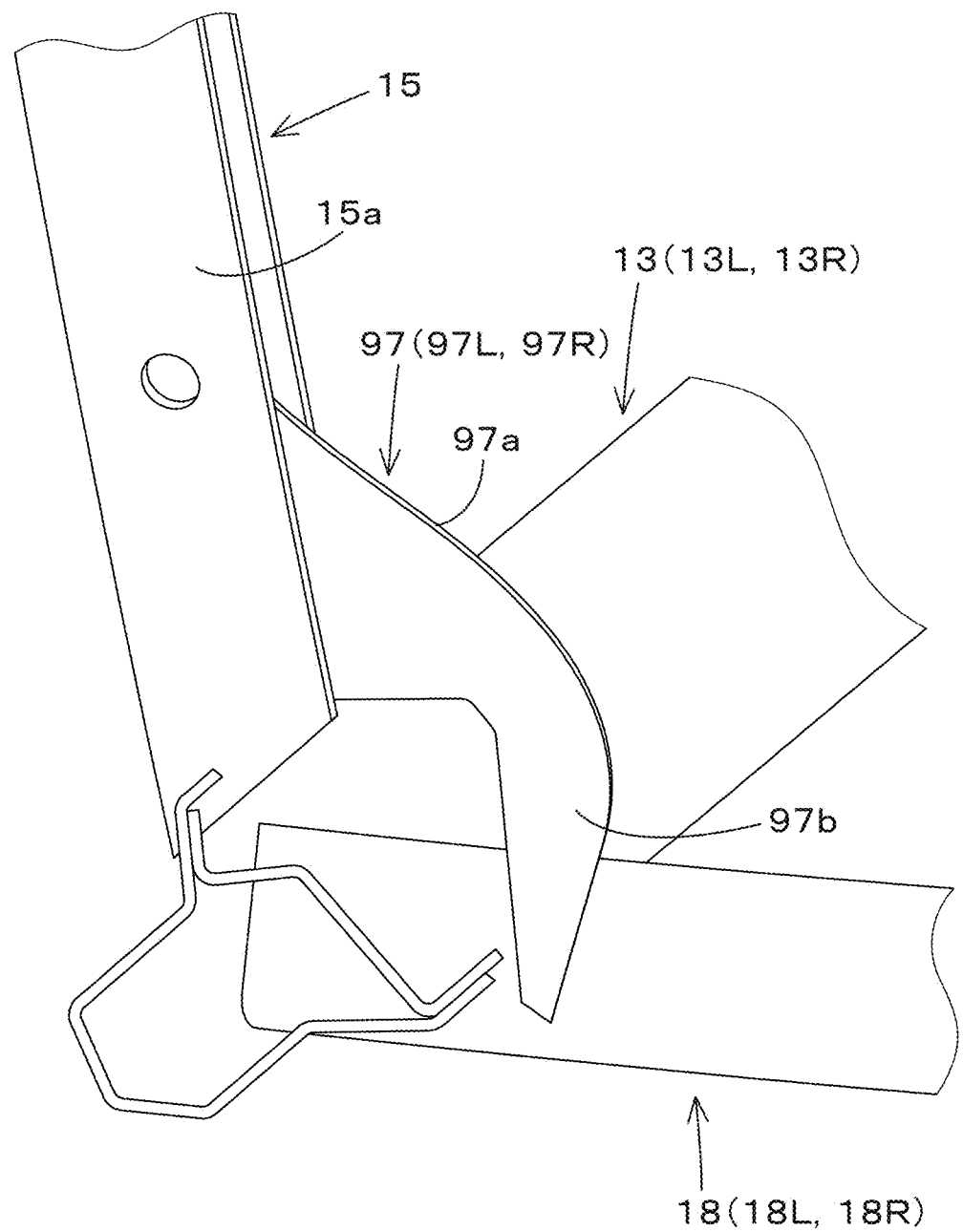
FIG. 26 is a perspective view of a corner portion between a front upper frame and a side upper frame.

As shown in FIG. 26, the seal catchers 97 each includes a base portion 97a and an extension portion 97b extending from the base portion 97a. The base portion 97a is arranged inward of the front pillars 13 in the width direction and is fixed to the upper wall 15a of the front upper frame 15. In addition, the base portion 97a protrudes backward from the front upper frame 15. An extension portion 97b extends outward from the rear of the base portion 97a in the width direction and toward above the side upper frames 18.

Side portions of the front upper frame 15 have curved shapes extending downwardly outward in the width direction, the front portions of the side upper frames 18 have curved shapes extending forwardly downward, and the front pillars 13 are also present. Accordingly, it is difficult to continuously install the sealing members to the side upper frames 18 from the front upper frame 15 through the front pillars 13, but when the seal catchers 97 are provided, the sealing members can be installed from the rounded front upper frame 15 to the rounded side upper frames 18, and thus the sealing members can be easily and continuously installed.

Figure 27:
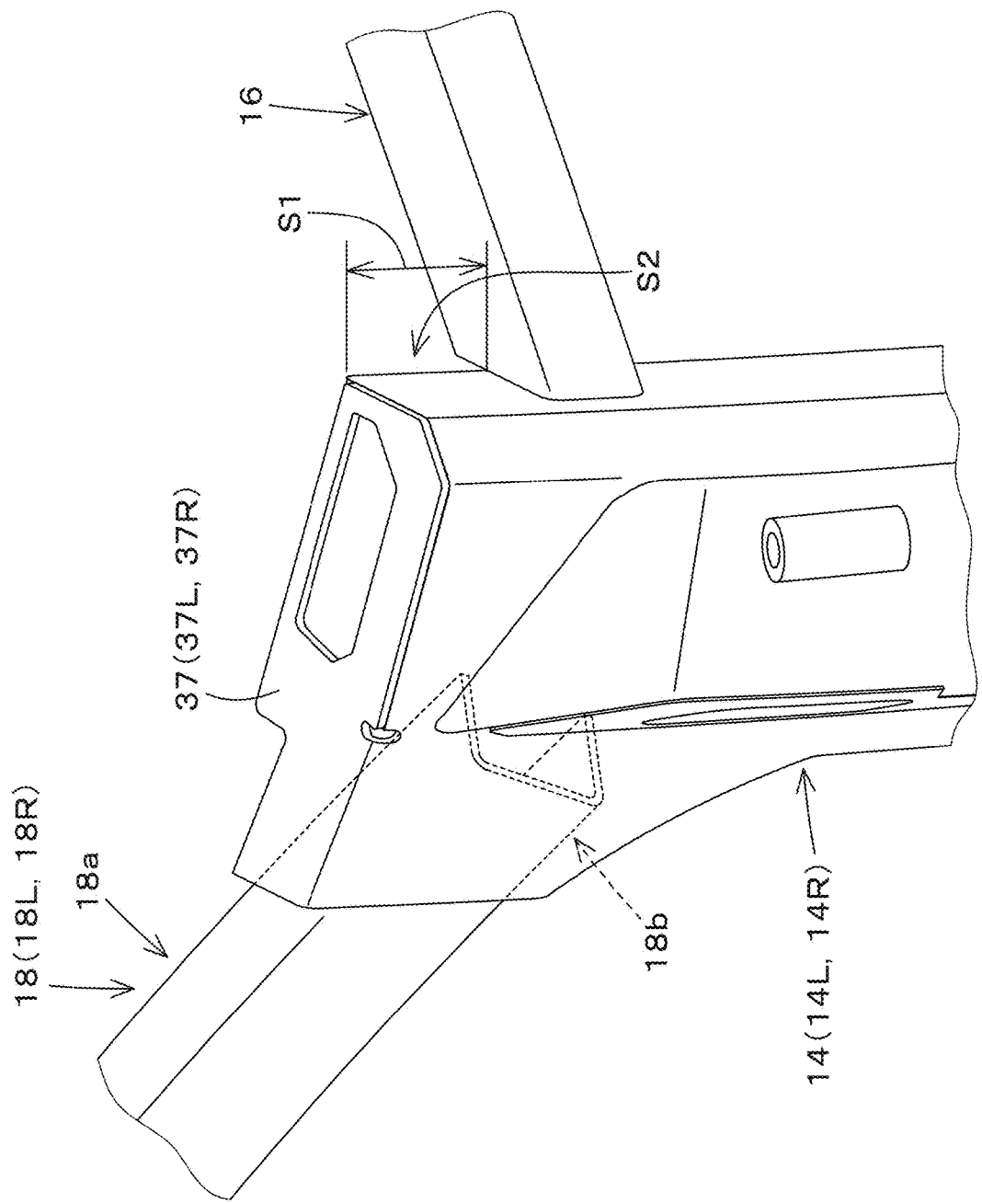
FIG. 27 is a perspective view of a corner portion between a rear upper frame and the side upper frame.

As shown in FIGS. 23 and 27, rear portions of the side upper frames 18 are arranged below the upper walls 37 of the rear pillars 14. In particular, a rear portion of the first side upper frame 18L enters below the first upper wall 37L of the first rear pillar 14L, and the rear portion of the second side upper frame 18R enters below the second upper wall 37R of the second rear pillar 14R. That is, the first rear pillar 14L has the first upper wall 37L under which a rear portion of the first side upper frame 18L is arranged, and the second rear pillar 14R has the second upper wall 37R under which the rear portion of the second side upper frame 18R is arranged. In this manner, the sealing members can be continuously installed from the upper surfaces of the side upper frames 18 to the upper surfaces of the rear pillars 14.

When the air conditioner 26 is mounted on the rear upper frame 16 in the conventional technique, the steps between the rear pillars 14 and the rear upper frame 16 (differences in height between upper surfaces of the rear pillars 14 and an upper surface of the rear upper frame 16) needs to be deep (large) in order to suppress the height of the air conditioner 26. For this reason, sealing members have to be stacked up to fill the gap, resulting in a problem of poor sealing performance at the gap. In addition, since a mounting portion of the air conditioner 26 is clearly visible, the presence of mounting the air conditioner 26 cannot be ignored.

In the present preferred embodiment, as shown in FIG. 23, by forming the side upper frames 18 to have curved shapes protruding upward, the rear portions 18a of the side upper frames 18 preferably have curved shapes extending backwardly downward. In other words, the side upper frames 18 are formed so that the rear portions 18a are lowered. In this manner, the heights of the rear ends 18b of the side upper frames 18 can be close to the height of the rear upper frame 16. By bringing the heights of the rear ends 18b of the side upper frames 18 closer to the height of the rear upper frame 16, the heights of the upper walls 37 of the rear pillars 14 can be lowered. In this manner, a step S1 in a height direction (in the vertical direction) between the upper walls 37 and the rear upper frame 16 can be reduced. By reducing this step S1, the sealing performance of a step S2 (see FIG. 27) can be improved, and the shape of the roof 9 (that is, an outer roof 25) can be made with the presence of the air conditioner 26 eliminated.

In this preferred embodiment, as shown in FIG. 23, the rear ends 18b of the side upper frames 18 (that is, the first side upper frame 18L and the second side upper frame 18R) are located at the height of the rear upper frame 16. The rear ends of the side upper frames 18 and the upper surface of the rear upper frame 16 may be at the same height or may be slightly different in height in the vertical direction.

By arranging the rear ends 18b of the side upper frames 18 at the height position of the rear upper frame 16, the heights of the upper walls 37 of the rear pillars 14 can be matched to the heights of the rear ends 18b of the side upper frames 18 and the rear upper frame 16, as shown by a two-dot chain line in FIG. 23. By matching the heights of the upper walls 37 of the rear pillars 14 to the heights of the rear ends 18b of the side upper frames 18 and the height of the rear upper frame 16, the sealing members can be continuously installed from the side upper frames 18 to the rear upper frame 16 through the upper walls 37 of the rear pillars 14. The sealing members can be continuously formed (in an annular shape), the sealing members being installed to the front upper frame 15 through the first seal catcher 97L, the first side upper frame 18L, the first upper wall 37L of the first rear pillar 14L, the rear upper frame 16, the second upper wall 37R of the second rear pillar 14R, the second side upper frame 18R, and the second seal catcher 97R.

The cabin 1 according to the present preferred embodiment achieves the following effects.

The cabin 1 mounted on the machine body 3, includes the rear pillar 14 located at the rear portion of a side surface of the cabin 1. The rear pillar 14 is hollow, and includes the interior opening 59 through which the pillar inside 38 that is an inside of the rear pillar 14 is communicated with the cabin interior, and the exterior opening 55 through which the pillar inside 38 is communicated with the cabin exterior.

According to this configuration, the outside air can be taken from the exterior opening 55 into the cabin interior through the pillar inside 38 and the interior opening 59. By providing the ventilation function in the rear pillar 14, it is not necessary to use the quarter glass as a component for the ventilation. And, since there is no need to install the center pillar for installing the quarter glass, the view of a side area from the cabin 1 can be improved. In addition, a cost reduction can be achieved by reducing the number of components.

The rear pillar 14 includes the lid 60 configured to swing between the closing position X1 to allow the lid 60 to close the interior opening 59 and the opening position X2 to allow the lid 60 to open the interior opening 59 when the lid 60 swings from the closing position X1 toward the pillar inside 38, and the biasing member 66 to bias the lid 60 in a direction from the opening position X2 toward the closing position X1.

According to this configuration, when the internal pressure in the cabin interior becomes high because the door 27 of the cabin 1 is closed, the internal pressure causes the lid 60 to open against the force of the biasing member 66. That is, when the door 27 is closed, the lid 60 opens to release the air in the cabin interior, and the door 27 can be closed smoothly.

In addition, the rear pillar 14 includes an opening forming portion (that is, the contacting wall 34a) oriented forward and formed with the exterior opening 55.

According to this configuration, when the machine body 3 with the cabin 1 mounted thereon travels forward, the outside air can be taken well into the cabin through the exterior opening 55.

The opening forming portion (that is, the contacting wall 34a) has an inclining shape extending backwardly and outwardly in the width direction of the cabin 1.

According to this configuration, a view of a rear area from the cabin interior can be improved.

In addition, the cabin 1 includes the front pillar 13 located at the front portion of the side surface, the door 27 located between the front pillar 13 and the rear pillar 14, the first door hinge 29 attached to the upper portion of the rear pillar 14 to support the door 27, and the second door hinge 30 attached to the lower portion of the rear pillar 14 to support the door 27. The exterior opening 55 is located between the first door hinge 29 and the second door hinge 30.

According to this configuration, a space between the first door hinge 29 and the second door hinge 30 can be used to form the exterior opening 55 in the rear pillar 14.

The rear pillar 14 includes the first communicating opening 53 and second communicating opening 54 through which the pillar inside 38 is communicated with the cabin exterior, the first communicating opening 53 and second communicating opening 54 being different from the exterior opening 55, the first communicating opening 53 is located at the portion corresponding to the first door hinge 29, and the second communicating opening 54 is located at the portion corresponding to the second door hinge 30.

According to this configuration, the amount of outside air taken into the pillar inside 38 can be increased by the first and second communicating openings 53 and 54. And, the first and second door hinges 29 and 30 can prevent the water derived from rain or from car washing from entering through the first and second communicating openings 53 and 54.

In addition, the cabin 1 includes the lid operation mechanism 65 to move the lid 60 from the closing position X1 to the opening position X2 and hold the lid 60 at the opening position X2.

According to this configuration, an opening and closing operation of the lid can be remotely operated, for example, the opening and closing operation of the lid 60 can be performed in the vicinity of the driver seat 6.

The cabin 1 includes the roof 9 that is preferably hollow and the air conditioner 26 located inside the roof 9. The rear pillar 14 includes the outside-air inlet 37a through which the pillar inside 38 is communicated with the inside of the roof 9.

When the outside-air inlet is provided in the roof 9 of the cabin 1 to take the outside air into the inside of the roof 9, the outside air is heated by the roof 9 which is strongly exposed to solar radiation, causing the performance deterioration of the air conditioner 26. However, in this preferred embodiment, the outside air can be distributed in a short distance from a portion with less solar radiation effect to the air conditioner 26, and thus the performance of the air conditioner 26 can be improved. In addition, the appearance of the roof 9 can be improved compared to the case where the outside-air inlet is provided in the roof 9 of the cabin 1.

In addition, the rear pillar 14 includes the partition wall 67 to partition the pillar inside 38 into the ventilation path 68 through which the outside air taken from the external opening 55 flows toward the interior opening 59 and the outside-air inlet path 69 through which the outside air taken from the external opening 55 flows toward the outside-air inlet 37a, and the outside-air filter 70 attached to the partition wall 67 and configured to remove dust included in the outside air flowing from the exterior opening 55 to the outside-air inlet path.

According to this configuration, the outside air can be fed to the air conditioner 26 after dust in the outside air taken in from the interior opening 59 is removed.

The cabin 1 includes the inner roof 24 defining the ceiling portion of the cabin interior and the resonator 86 to reduce booming noises generated in the cabin interior. The inner roof 24 is formed of resin, and the resonator 86 is formed of the resin defining the inner roof 24 integrally with the inner roof 24.

According to this configuration, an additional component for attaching the resonator 86 to the inner roof 24 is not required, and the resonator 86 can be installed on the inner roof 24 without additional costs and space.

The cabin 1 includes the driver seat 6 located in the cabin interior. The resonator 86 is located above the driver seat 6 and has at least one resonance tube (that is, the first resonance tube 86A to the third resonance tube 86C). The resonance tubes 86A to 86C each preferably have a tubular shape extending in the fore-and-aft direction, and each includes the closed front end and the rear end that has the opening hole 87 facing the cabin interior.

According to this configuration, the noise at the operator's ear can be reduced.

The resonator 86 includes the plurality of resonance tubes (that is, the first resonance tube 86A to the third resonance tube 86C) having different lengths and being arranged side by side in a width direction of the inner roof 24.

According to this configuration, the resonator 86, which reduces the noise at the operator's ear, can be compactly installed in the inner roof 24.

The inner roof 24 includes the downwardly opening recess 88 formed by upwardly recessing the wall defining the inner roof 24, and the resonator 86 is formed integrally on the upper wall 88b of the recess 88.

According to this configuration, it is possible to prevent the head clearance from being narrowed by the resonator 86.

The resonator 86 protrudes upward and downward from the upper wall 88b of the recess 88.

According to this configuration, the head clearance for the operator can be secured.

The cabin 1 mounted on the machine body 3, includes the first front pillar 13L and second front pillar 13R arranged side by side at an interval in the width direction of the cabin 1, the first rear pillar 14L located rearward from the first front pillar 13L, the second rear pillar 14R located rearward from the second front pillar 13R, the front upper frame 15 coupling the upper portion of the first front pillar 13L and the upper portion of the second front pillar 13R to each other, the rear upper frame 16 coupling the upper portion of the first rear pillar 14L and the upper portion of the second rear pillar 14R to each other, the first side upper frame 18L coupling the upper portion of the first front pillar 13L and the upper portion of the first rear pillar 14L to each other, and the second side upper frame 18R coupling the upper portion of the second front pillar 13R and the upper portion of the second rear pillar 14R to each other. The front upper frame 15 preferably has the curved shape projecting upward in a front view, and the first side upper frame 18L and the second side upper frame 18R each preferably have the curved shape projecting upward in a side view.

According to this configuration, by forming the front upper frame 15, the first side upper frame 18L, and the second side upper frame 18R to have upwardly projecting curved shapes, it is possible to improve the strength of the cabin 1 and the view from the cabin 1.

The first side upper frame 18L and the second side upper frame 18R are extended upwardly and inwardly in the width direction and are each curved upward to have the arc shape.

According to this configuration, the first side upper frame 18L and the second side upper frame 18R can be fitted to the curved panel without curving the first side upper frame 18L and the second side upper frame 18R outwardly in the width direction of the cabin 1. In addition, since the first side upper frame 18L and the second side upper frame 18R need not be curved outward in the width direction of the cabin 1, the cabins 1 with different lengths in the fore-and-aft direction can be manufactured by differentiating the lengths of the first side upper frame 18L and the second side upper frame 18R in manufacturing the cabins 1 with different lengths in the fore-and-aft direction.

The first side upper frame 18L and the second side upper frame 18R each includes the rear end located at the same height with the rear upper frame 16.

According to this configuration, by reducing the height difference between the rear ends of the first side upper frame 18L and the second side upper frame 18R and the rear upper frame 16, the sealing members can be continuously arranged from the first side upper frame 18L and the second side upper frame 18R to the rear upper frame 16.

In addition, the cabin 1 includes the first seal catcher 97L with which the sealing member is in touch, the sealing member being arranged from one side of the upper surface of the front upper frame 15 to the upper surface of the first side upper frame 18L, and the second seal catcher 97R with which another sealing member is in touch, the other sealing member being arranged from the other side of the upper surface of the front upper frame 15 to the upper surface of the second side upper frame 18R.

According to this configuration, the sealing members can be continuously installed from the curved-shaped first and second side upper frames 18L and 18R to the curved-shaped front upper frame 15.

The first rear pillar 14L includes the first upper wall 37L under which the rear portion of the first side upper frame 18L is to be arranged, and the second rear pillar 14R includes the second upper wall 37R under which the rear portion of the second side upper frame 18R is to be arranged.

According to this configuration, the sealing member can be continuously installed from the upper surface of the first side upper frame 18L to the first upper wall 37L, and the sealing member can be continuously installed from the upper surface of the second side upper frame 18R to the second upper wall 37R.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A cabin mounted on a machine body, the cabin comprising:
    a rear pillar located at a rear portion of a side surface of the cabin, the rear pillar being hollow; and
    a door to open and close a passenger entrance of the cabin; wherein
    the rear pillar includes:
        an interior opening through which a pillar inside, which is an inside of the rear pillar, is communicated with a cabin interior;
        an exterior opening through which the pillar inside is communicated with a cabin exterior;
        a lid movable between:
            a closing position to allow the lid to close the interior opening; and
            an opening position to allow the lid to open the interior opening when the lid moves from the closing position toward the pillar inside; and
        a biasing member to bias the lid in a direction from the opening position toward the closing position;
    the cabin includes a lid operator to move the lid from the closing position to the opening position and hold the lid at the opening position; and
    the lid is configured such that, when the lid is in the closing position in which the lid is not moved by the lid operator to the opening position, the lid is pushed by an internal pressure of the cabin interior to swing in an opening direction against a biasing force of the biasing member when the door is closed from an opening state.

2. The cabin according to claim 1, wherein
    the lid is supported by the rear pillar with a pivot axis extending in a vertical direction such that the lid is pivotable about the pivot axis; and
    the biasing member includes a spring.

3. The cabin according to claim 1, wherein the rear pillar includes an opening forming portion oriented forward and formed with the exterior opening.

4. The cabin according to claim 3, wherein the opening forming portion extends backwardly and outwardly in a width direction of the cabin.

5. The cabin according to claim 1, further comprising:
    a front pillar located at a front portion of the side surface;
    a first door hinge attached to an upper portion of the rear pillar to support the door; and
    a second door hinge attached to a lower portion of the rear pillar to support the door; wherein
    the door is located between the front pillar and the rear pillar; and
    the exterior opening is located between the first door hinge and the second door hinge.

6. The cabin according to claim 5, wherein
    the rear pillar includes a first communicating opening and second communicating opening through which the pillar inside is communicated with the cabin exterior, the first communicating opening and second communicating opening being different from the exterior opening;
    the first communicating opening is located at a portion corresponding to the first door hinge; and
    the second communicating opening is located at a portion corresponding to the second door hinge.

7. The cabin according to claim 1, wherein
    the door is supported by the rear pillar; and
    the rear pillar includes a first portion and a second portion, the first portion being a portion to which the door contacts, the second portion extending outward in a width direction of the cabin from the first portion, facing forward, and including the exterior opening.

8. The cabin according to claim 1, further comprising:
    a roof that is hollow; and
    an air conditioner located inside the roof; wherein
    the rear pillar includes an outside-air inlet through which the pillar inside is communicated with the inside of the roof.

9. The cabin according to claim 8, wherein
    the rear pillar includes:
        a partition wall to partition the pillar inside into a ventilation path through which outside air taken from the external opening flows toward the interior opening and an outside-air inlet path through which the outside air taken from the external opening flows toward the outside-air inlet; and
        an outside-air filter attached to the partition wall to remove dust included in the outside air flowing from the exterior opening to the outside-air inlet path.

10. The cabin according to claim 1, further comprising:
    an inner roof defining a ceiling portion of the cabin interior; and
    a resonator to reduce booming noises generated in the cabin interior; wherein
    the inner roof includes resin, and
    the resonator includes the resin of the inner roof and is integral with the inner roof.

11. The cabin according to claim 10, further comprising:
    a driver seat located in the cabin interior; wherein
    the resonator is located above the driver seat and includes at least one resonance tube; and
    the resonance tube has a tubular shape extending in a fore-and-aft direction, and includes a closed front end and a rear end that has an opening hole facing the cabin interior.

12. The cabin according to claim 11, wherein the resonator includes the plurality of resonance tubes with different lengths and being arranged side by side in a width direction of the inner roof.

13. The cabin according to claim 10, wherein
the inner roof includes a downwardly opening recess defined by an upwardly recessed portion of a wall defining the inner roof; and
the resonator is integral on an upper wall of the recess.

14. The cabin according to claim 13, wherein the resonator protrudes upward and downward from the upper wall of the recess.

15. The cabin according to claim 1, further comprising:
a first front pillar and a second front pillar arranged side by side at an interval in a width direction of the cabin;
a first rear pillar and a second rear pillar, the first rear pillar being located rearward from the first front pillar, and the second rear pillar being located rearward from the second front pillar;
a front upper frame and a rear upper frame, the front upper frame coupling an upper portion of the first front pillar and an upper portion of the second front pillar to each other, and the rear upper frame coupling an upper portion of the first rear pillar and an upper portion of the second rear pillar to each other; and
a first side upper frame and a second side upper frame, the first side upper frame coupling an upper portion of the first front pillar and an upper portion of the first rear pillar to each other, and the second side upper frame coupling an upper portion of the second front pillar and an upper portion of the second rear pillar to each other; wherein
the front upper frame has a curved shape projecting upward in a front view; and
each of the first side upper frame and the second side upper frame has a curved shape projecting upward in a side view.

16. The cabin according to claim 15, wherein the first side upper frame and the second side upper frame extend upwardly and inwardly in the width direction and are each curved upward to have an arc shape.

17. The cabin according to claim 15, wherein the first side upper frame and the second side upper frame each include a rear end located at a same height with the rear upper frame.

18. The cabin according to claim 15, further comprising:
a first seal catcher extending from one side of an upper surface of the front upper frame to an upper surface of the first side upper frame; and
a second seal catcher extending from the other side of the upper surface of the front upper frame to an upper surface of the second side upper frame.

19. The cabin according to claim 15, wherein
the first rear pillar includes a first upper wall under which a rear portion of the first side upper frame is to be provided; and
the second rear pillar includes a second upper wall under which a rear portion of the second side upper frame is to be provided.

* * * * *